(12) United States Patent
Fu et al.

(10) Patent No.: US 10,878,096 B2
(45) Date of Patent: Dec. 29, 2020

(54) BIOS STARTUP METHOD AND DATA PROCESSING METHOD

(71) Applicant: Alibaba Group Holding Limited, Grand Cayman (KY)

(72) Inventors: Yingfang Fu, Beijing (CN); Peng Xiao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 106 days.

(21) Appl. No.: 16/206,904

(22) Filed: Nov. 30, 2018

(65) Prior Publication Data

US 2019/0121981 A1 Apr. 25, 2019

(30) Foreign Application Priority Data

Oct. 25, 2017 (CN) .......................... 2017 1 1016399

(51) Int. Cl.
*G06F 21/57* (2013.01)
*H04L 9/32* (2006.01)
*G06F 9/4401* (2018.01)

(52) U.S. Cl.
CPC .......... *G06F 21/572* (2013.01); *G06F 9/4401* (2013.01); *H04L 9/3263* (2013.01)

(58) Field of Classification Search
CPC ..... H04L 9/3263; G06F 9/4401; G06F 21/572
USPC ......................................................... 726/26
See application file for complete search history.

(56) References Cited

U.S. PATENT DOCUMENTS

| | | |
|---|---|---|
| 6,715,074 B1 | 3/2004 | Chaiken |
| 8,656,146 B2 | 2/2014 | Findeisen et al. |
| 9,053,323 B2 | 6/2015 | Balacheff et al. |
| 9,183,394 B2 | 11/2015 | Henry |
| 9,742,568 B2 | 8/2017 | Rao et al. |
| 10,296,353 B2 | 5/2019 | Liu et al. |
| 2004/0073806 A1 | 4/2004 | Zimmer |
| 2008/0034350 A1 | 2/2008 | Conti |
| 2012/0266209 A1 | 10/2012 | Gooding et al. |
| 2013/0125244 A1 | 5/2013 | Sugano |
| 2015/0220736 A1 | 8/2015 | Martinez et al. |
| 2016/0055332 A1 | 2/2016 | Jeansonne et al. |

OTHER PUBLICATIONS

PCT Search Report and Written Opinion dated Feb. 28, 2019 for PCT Application No. PCT/US2018/063467, 7 pages.

*Primary Examiner* — Malcolm Cribbs
*Assistant Examiner* — Angela R Holmes
(74) *Attorney, Agent, or Firm* — Lee & Hayes, P.C.

(57) ABSTRACT

A method including obtaining a BIOS image file carrying a private key signature of the BIOS management server, verifying that the BIOS image file has validity according to a public key of the BIOS management server, and verifying that the BIOS image file has integrity according to the pre-stored first file parameter. If both the validity and integrity of the BIOS image file are verified, the BIOS is started. This present disclosure improves the security and reliability of the data server.

20 Claims, 13 Drawing Sheets

BIOS STARTUP METHOD AND DATA PROCESSING METHOD

CROSS REFERENCE TO RELATED PATENT APPLICATIONS

This application claims priority to Chinese Patent Application No. 201711016399.2 filed on 25 Oct. 2017 and entitled "BIOS STARTUP METHOD AND DATA PROCESSING METHOD," which is incorporated herein by reference in its entirety.

TECHNICAL FIELD

The present disclosure relates to the field of computer technology, and, more particularly, to BIOS (Basic Input Output System) startup methods and data processing methods.

BACKGROUND

With the development of computer technology, the application of various computing devices has become increasingly extensive. Computing devices typically include a hardware system, a BIOS, and an operating system.

The BIOS is a set of programs that are fixed in a ROM (Read Only Memory) chip. It provides the lowest level and most direct hardware setting or control interface for the operating system. The operating system may control the hardware system through the BIOS, and thus implement the functions of the device. That is, the BIOS is an important bridge for the operating system of the communication hardware system in the computing device. Whether the BIOS may be safely booted directly affects the security and reliability of the computing device. Therefore, a BIOS startup method is urgently needed.

In the conventional techniques, the computing device may obtain and write an image file in the ROM in advance. When the computing device is started, the computing device may start the flashed BIOS image file from the ROM, and the BIOS image file is successfully started. Afterwards, the upper layer operating system may be loaded to make the computing device operate normally.

However, in the conventional techniques, since the flashed BIOS image in the ROM may be tampered with or damaged, that is, the booted BIOS image file may be a tampered or corrupted BIOS image file. The startup of such BIOS image file may cause problems such as abnormal operation of the computing device or data leakage, which seriously threatens the security and reliability of the computing device.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above problems, the present disclosure provides BIOS boot methods and data processing methods that overcome the above problems or at least partially solve the above problems.

According to a first aspect of the present disclosure, a BIOS startup method is provided, including:
providing a BIOS image file, wherein the BIOS image file carries a private key signature of a BIOS management server;
verifying that the BIOS image file has validity according to a public key of the BIOS management server;
verifying that the BIOS image file has integrity according to a pre-stored first file parameter;
if the validity and integrity of the BIOS image file are verified, the BIOS is started.

Optionally, the method further includes:
If the validity or integrity verification of the BIOS image file fails, the BIOS startup is prohibited.

Optionally, the verifying, by the pre-stored first file parameter, that the BIOS image file has integrity includes:
generating a corresponding second file parameter according to the BIOS image file;
verifying that the second file parameter is consistent with the first file parameter, and if they are consistent, determining that the BIOS image file has integrity.

Optionally, the first file parameter carries the private key signature of the data server, and after the generating the corresponding second file parameter according to the BIOS image file, the method further includes:
signing the second file parameter according to the private key of the data server.

Optionally, before the verifying that the second file parameter is consistent with the first file parameter, the method further includes:
obtaining the first file parameter from a local storage.

Optionally, the first file parameter is stored in the BIOS management server, and the verifying whether the second file parameter is consistent with the first file parameter includes:
sending the second file parameter to the BIOS management server; and
determining, if the second file parameter fed back by the BIOS management server is consistent with the first file parameter, that the BIOS image file has integrity.

Optionally, before the sending the second file parameter to the BIOS management server, the method further includes:
signing the second file parameter according to the public key of the BIOS management server.

According to a second aspect of the present disclosure, a BIOS startup method is provided, including:
receiving a verification request of the data server for the integrity of the BIOS image file;
verifying the integrity of the BIOS image file according to the first file parameter stored locally; and
feeding back the verification result of the integrity verification to the data server.

Optionally, the verification request carries the second file parameter generated by the data server according to the BIOS image file, and the verifying the integrity of the BIOS image file according to the locally stored first file parameter includes:
verifying whether the second file parameter is consistent with the first file parameter, and if they are consistent, determining that the BIOS image file has integrity.

Optionally, the first file parameter and the second file parameter both carry the private key signature of the data server.

Optionally, the second file parameter carries the public key signature of the BIOS management server, and the method further includes: before the verifying whether the second file parameter is consistent with the first file parameter, verifying the validity of the second file parameter according to the private key of the BIOS management server.

According to a third aspect of the present disclosure, a data processing method is provided, including:

obtaining a BIOS image file, wherein the BIOS image file carries a private key signature of the BIOS management server;

determining validity of a source of the BIOS image file according to a public key of the BIOS management server; and determining that the BIOS image file is not modified according to the pre-stored first file parameter.

Optionally, after the verifying that the BIOS image file is not modified according to the pre-stored first file parameter, the method further includes performing a BIOS boot.

According to a fourth aspect of the present disclosure, a computing device is provided, which includes one or more memories, one or more processors, and computer program stored on the memories and executable by the one or more processors that cause the processors executing the computer program to implement one or more of the above described methods.

According to a fifth aspect of the present disclosure, one or more computer readable storage media stored thereon a computer program are provided, which, when executed by one or more processors, implement one or more of the above described methods.

In the example embodiment of the present disclosure, the BIOS image file to be started may be obtained. The validity of the BIOS image file is verified according to the private key signature of the BIOS management server carried in the BIOS image file. The integrity of the BIOS image file is verified according to the first file parameter. Thus, the techniques of the present disclosure determined that the BIOS image file to be started is secured and reliable, reduces the possibility of booting the modified or damaged BIOS image file, and improve the security and reliability of the data server.

The above description is only an overview of the technical solutions of the present disclosure. To make the technical solutions of the present disclosure more clearly understood and implemented in accordance with the contents of the specification, and to make the above and other objects, features and advantages of the present disclosure more clearly understood, the following example embodiments of the present disclosure are provided.

BRIEF DESCRIPTION OF THE DRAWINGS

Through the detailed description of the example embodiments herein, the various advantages and benefits will be clearer to one of ordinary skill in the art. The accompanying drawings are only used to illustrate the example embodiments and shall not be construed as a limitation to the present disclosure. In the drawings, some numerals refer to the same component. In the drawings.

DETAILED DESCRIPTION

Figure 1:
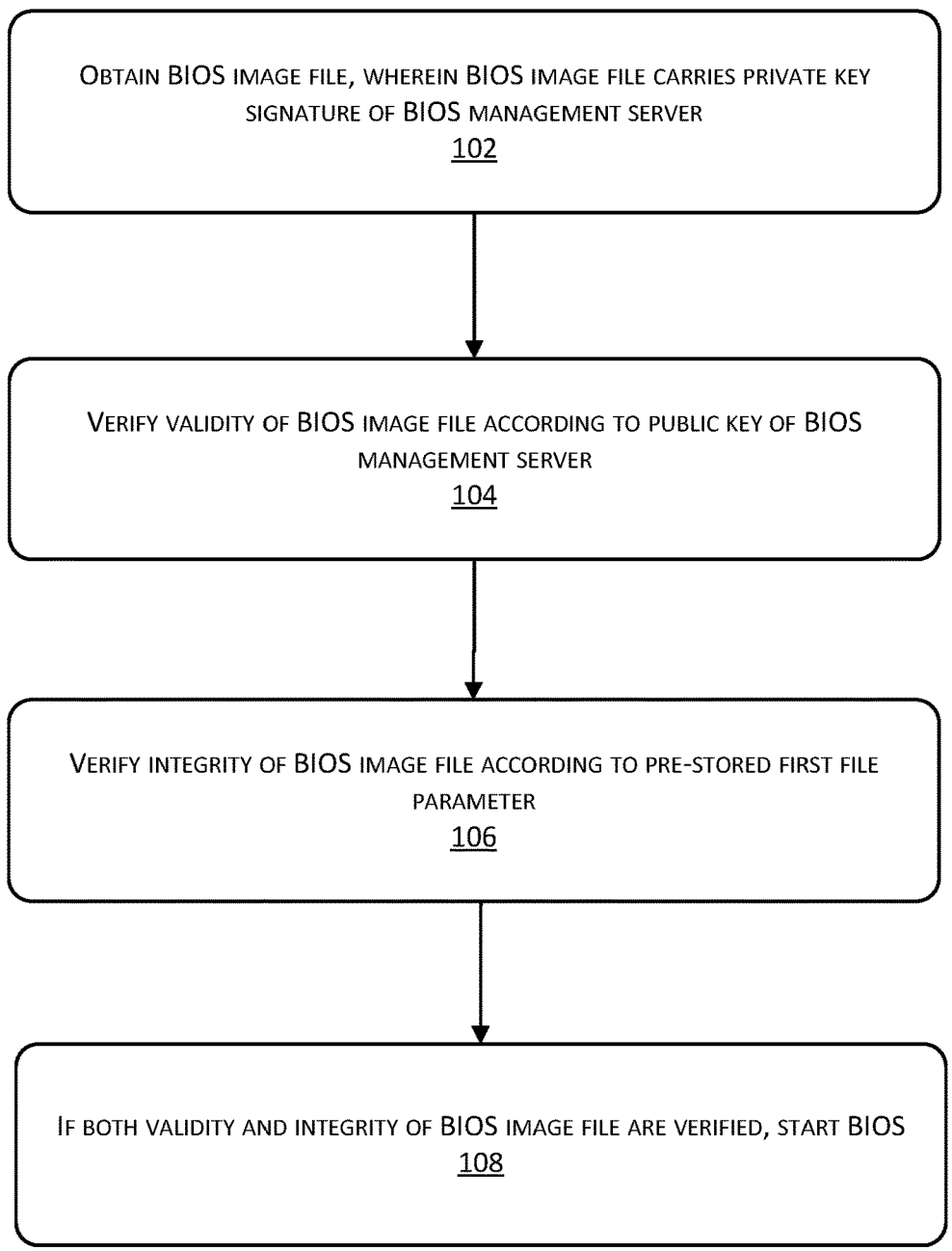
FIG. 1 is a flowchart of a BIOS startup method according to a first example embodiment of the present disclosure.

Example embodiments of the present disclosure will be described in more detail below with reference to the accompanying drawings. While the example embodiments of the present disclosure are shown in the drawings, it is understood that the present disclosure may be embodied in various forms and not limited by the example embodiments set forth herein. Rather, these example embodiments are provided so that this disclosure may be more thoroughly understood, and the scope of the application may be fully conveyed to one of ordinary skill in the art.

In order to facilitate a person skilled in the art to deeply understand the example embodiments of the present disclosure, the definitions of the technical terms involved in the example embodiments of the present disclosure will be first introduced below.

The BIOS image file is written to the ROM chip of the computing device, so that when the computing device starts the BIOS image file, the operating system is provided with the lowest level and the most direct hardware setting or control interface, so as to control the hardware device to run through the operating system.

The computing device may include devices capable of acquiring, writing, or booting the BIOS image file, such as a cell phone, a personal computer, a tablet, a wearable device, a smart television, a data server, and the like. The computing device may interact with the BIOS management server to obtain a client terminal, a plug-in, and a BIOS startup service, and include the apparatus shown in FIG. 10, 12, or 13 below, and implement the method steps relating to the data server in the method flowchart as shown in FIGS. 1, 2, 4-6, 8, and 9, thereby implementing the BIOS start. In the following example embodiments, the BIOS startup method provided by the present disclosure is described by only taking the computing device as the data server as an example. The computing device may include a TPM (Trusted Platform Module) and verify the BIOS image file by the TPM.

The BIOS management server may include a server or a cluster of servers to provide the aforementioned client, plug-in, or BIOS boot services for the computing device. The BIOS management server may implement the method steps of the BIOS management server in the method flowchart of FIG. 3, 4, 6, 7, or 9 below.

The private key signature of the BIOS management server is obtained by signing the data through the private key of the BIOS management server and signing the data means encrypting the data. The data encrypted by the private key of the BIOS management server is decrypted by the public key of the BIOS server, that is, the validity verification is performed. If the verification is successful, the data may be described as data from the BIOS server, that is, the source of this data is secured and reliable. Certainly, the data may also be encrypted by the private key of the BIOS management server, and the encrypted data is decrypted by the public key of the BIOS management server.

The private key signature of the BIOS management server carried in the BIOS image file may be obtained by signing the BIOS image file by using the private key of the BIOS management server when sending the BIOS image file to the computing device.

The computing device may obtain the corresponding public key and private key from the trusted third-party device (such as the computing device and the PCA (Platform Certification Authority) of the server cluster where the BIOS server is located), and the public key of the BIOS server. Corresponding, the server may obtain the corresponding public key and private key and the public key of the computing device using the same method. The third-party device may store the public key and the private key of the PCA.

The first file parameter may be generated according to the overall content of the BIOS image file. The first file parameter is used to describe the overall content of the BIOS image file and is used for integrity verification of the BIOS image file, so as to explain whether the BIOS image file is complete. If the BIOS image file is determined to have integrity, all contents of the BIOS image file are determined to be complete, that is, are not tampered with or damaged. For example, the first file parameter may include a hash value generated according to the BIOS image file, or a summary composed of at least a part of the data in the BIOS image file. The first file parameter may be obtained and stored by the computing device according to the BIOS image file when the computing device is flashing the BIOS image file.

The client terminal may include at least one application. The client terminal may run in the computing device to implement the BIOS startup method provided by the example embodiment of the present disclosure.

The plug-in may be included in the above-mentioned application running in the computing device, so as to implement the BIOS startup method provided by the example embodiment of the present disclosure.

The example embodiments of the present disclosure may be applied to a scenario in which the computing device starts the BIOS. The flashed BIOS image in the ROM may be tampered with or damaged. That is, the booted BIOS image file may be a tampered or corrupted BIOS image file. Starting such BIOS image file may cause the computing device to run abnormally or data leakage and other issues, thereby threatening the security and reliability of the computing device. Therefore, in order to reduce the problem of the security and reliability of the computing device that may be caused by the above reasons, the validity of the BIOS image file may be verified according to the public key of the BIOS manager server when starting the BIOS image file, to determine that the source of the BIOS image file to be started is secured and reliable. The integrity of the BIOS image file may be verified according to the pre-stored first file parameter to determine the BIOS image file to be started is complete. If the verification is passed, the BIOS image file to be started is determined to be secured and reliable. Therefore, starting the BIOS image file may ensure the security and reliability of the computing device.

First Example Embodiment 1

Referring to FIG. 1, a flowchart of a BIOS startup method according to an example embodiment of the present disclosure is shown. The detailed steps include:

Step 102: Obtain a BIOS image file, wherein the BIOS image file carries a private key signature of the BIOS management server.

With respect to a data server that has been flashed with the BIOS image file, the data server may start the BIOS image file when a boot command is detected. To reduce the possibility of booting a tampered or corrupted BIOS image file, thereby improving the security and reliability of the data server, the BIOS image file may be verified. In order to verify the BIOS image file from any BIOS vendor, reduce the operation and maintenance cost, and improve the security and reliability of the data server, the BIOS image file may carry the private key signature of the BIOS management server.

The startup instruction is used to instruct to start the data server, and the startup instruction may be triggered by the user by performing a click operation, a touch operation, or the like. For example, the startup instruction may include an operation of pressing a power button.

The data server may obtain the BIOS image file to be started from the ROM.

The private key signature of the BIOS management server carried by the BIOS image file may be signed by the BIOS management server when the BIOS image file is sent to the data server.

Step 104: Verify the validity of the BIOS image file according to the public key of the BIOS management server.

In order to ensure that the source of the BIOS image file to be started is secured and reliable, thereby reducing the possibility of booting a damaged or corrupted BIOS image file and ensuring the security and reliability of the data server, the data server may verify the validity of the BIOS image file.

The BIOS image file carries the private key signature of the BIOS management server, so that the BIOS image file may be verified according to the public key of the BIOS management server. If the verification succeeds, the BIOS image file has validity, and the subsequent start process continues; otherwise, the BIOS image file is determined not to have validity and the BIOS startup is stopped.

The BIOS image file carrying the private key of the BIOS management server is verified according to the public key of the BIOS management server. That is, the BIOS image file carrying the private key of the BIOS management server is decrypted according to the public key of the BIOS management server. If the decryption is successful, the BIOS image file is determined to have validity; otherwise, the BIOS image file is invalid.

Step 106: Verify the integrity of the BIOS image file according to the pre-stored first file parameter.

In order to ensure that the BIOS image file to be booted is secured and reliable, thereby reducing the possibility of booting tampered or corrupted BIOS image files and ensuring the security and reliability of the data server, the data server may verify the integrity of the BIOS image file.

The data server may generate a file parameter according to the BIOS image file and compare the generated file parameter with the first file parameter. If they are consistent, the BIOS file is determined to have integrity; otherwise the BIOS image file is determined not to have integrity.

For example, when the first file parameter is a hash value of the BIOS image file, the data server may generate a hash value of the BIOS image file according to the BIOS image file and compare the generated hash value with the hash value carried by the BIOS image file. If they are consistent, the BIOS image file is determined to have integrity; otherwise the BIOS image file is determined not to have integrity.

Certainly, in practical applications, the data server may also verify the integrity of the BIOS image file at first and then verify the validity of the BIOS image file.

Step 108: If both the validity and integrity of the BIOS image file are verified, the BIOS is started.

If the validity and integrity of the BIOS image file are verified, the BIOS image file is secured and reliable. Therefore, the BIOS may be started.

In the example embodiment of the present disclosure, the BIOS image file to be started is obtained, and the BIOS image file is validated according to the private key signature of the BIOS management server carried in the BIOS image file, and the integrity of the BIOS image file is verified according to the first file parameter. Therefore, the BIOS image file to be started is determined to be secured and reliable, which reduces the possibility of booting the tampered or damaged BIOS image file and improves the security and reliability of the data server.

Second Example Embodiment

Figure 2:
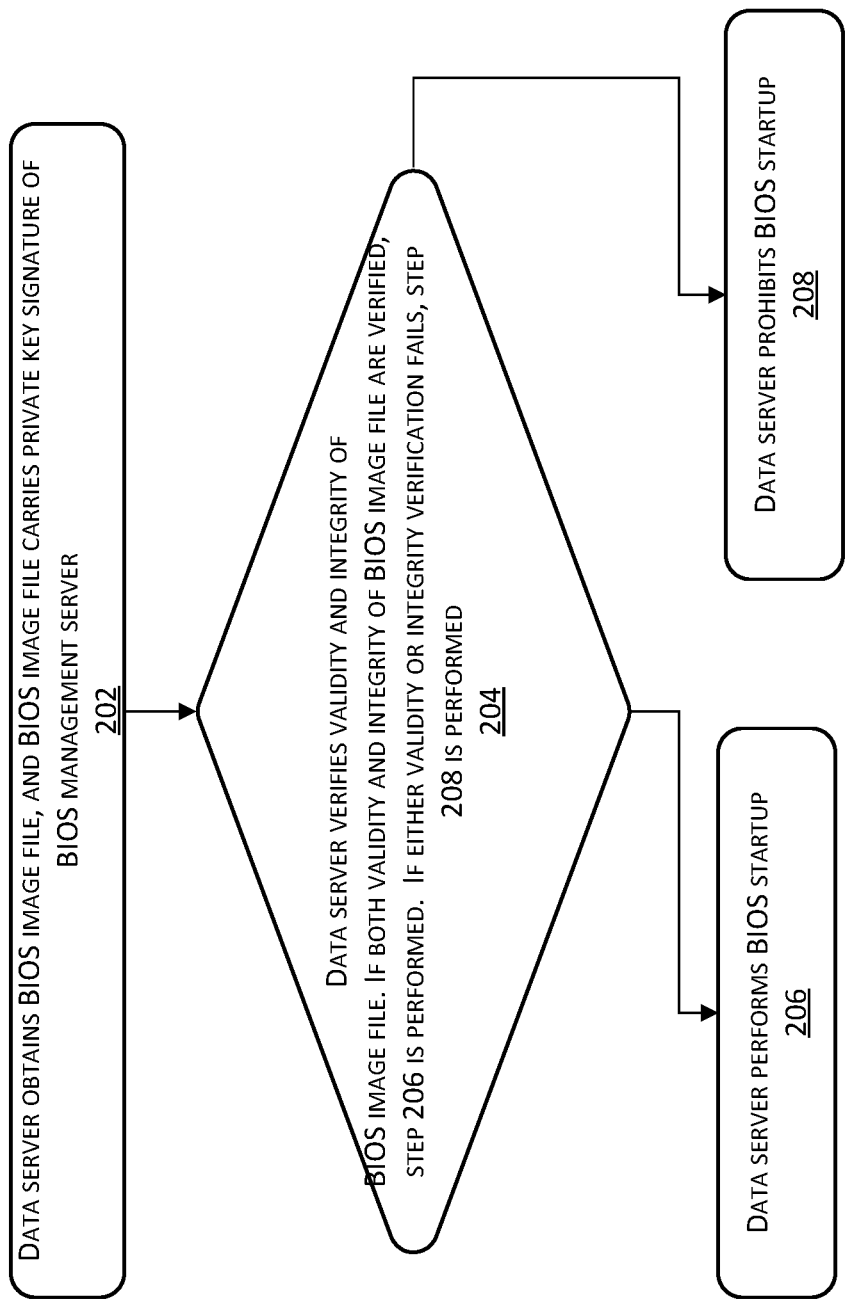
FIG. 2 is a flowchart of a BIOS startup method according to a second example embodiment of the present disclosure.

Referring to FIG. 2, a flowchart of a BIOS startup method according to an example embodiment of the present disclosure is applied to a data server, and the detailed steps include:

Step 202: The data server obtains a BIOS image file, and the BIOS image file carries a private key signature of the BIOS management server.

The manner in which the data server obtains the BIOS image file may refer to the related foregoing description and is not detailed herein for brevity.

Step 204: The data server verifies the validity and integrity of the BIOS image file. If both the validity and integrity of the BIOS image file are verified, step 206 is performed. If either the validity or integrity verification fails, step 208 is performed.

The manner in which the data server verifies the validity or integrity of the BIOS image file may refer to the related foregoing description, and the details are not described herein again for brevity.

In the example embodiment of the present disclosure, in order to quickly obtain the first file parameter, verify the integrity of the BIOS image file, and improve the efficiency of starting the BIOS, the data server may obtain the first file parameter from the local storage.

The data server may obtain the first file parameter from the NV (Non-volatile) space in the TPM.

After successfully writing the BIOS image file in the ROM, the data server may store the first file parameter of the BIOS image file in the NV space in the TPM.

In the example embodiment of the present disclosure, optionally, in order to improve the reliability of verifying the integrity of the BIOS, and further improve the security and reliability of the data server, the data server may generate a corresponding second file parameter according to the BIOS image file, and verify whether the second file parameter is consistent with the first file parameter. If they are consistent, the BIOS image file is determined to have integrity.

The manner in which the data server generates the second file parameter according to the BIOS image file may refer to the related foregoing description, and the details are not described herein again for brevity.

In the example embodiment, optionally, in order to improve the accuracy of calculating the second file parameter, and further improving the reliability of the integrity verification of the BIOS image file, the data server may also obtain the file parameter algorithm identifier and calculate the second file parameter according to the file parameter algorithm identifier and the BIOS image file.

The file parameter algorithm identifier is used to describe the file parameter according to the BIOS image file. For example, when the file parameter is a hash value, the file parameter algorithm identifier may include a hash value calculation type, including sha-1, sha-256, sha-3 and so on.

In the example embodiment of the present disclosure, optionally, in order to ensure the integrity of the BIOS image file that is currently being started by the data server and the BIOS image file that is previously written, and further reduce the possibility of booting the damaged or damaged BIOS image file, the first file parameter carries the private key signature of the data server. Correspondingly, after the corresponding second file parameter is generated according to the BIOS image file, the data server may sign the second file parameter according to the private key pair of the data server. That is, the second file parameter carrying the private key signature of the data server is compared with the first file parameter carrying the private key signature of the data server.

For example, the data server measures the BIOS image file to be started and obtains the second file parameter of the BIOS image file as hash (BIOS.ISO), that is, the hash value of the BIOS image file. According to the data server's private key AIKpriv_c, the second file parameter is signed to obtain {hash(BIOS.ISO)} AIKpriv_c, which is a hash value for carrying the private key of the data server. The pre-stored first file parameter that carries the private key signature of the data server stored is {hash (BIOS.ISO)} AIKpriv_c. The first file parameter is compared with the second file parameter to determine that the first file parameter is the same as the second file parameter. Therefore, the integrity of the BIOS image file is determined.

Step 206: The data server performs BIOS startup.

Because the validity and integrity verification of the BIOS image file are passed, the BIOS image file is secured and reliable. The BIOS may be started.

Step 208: The data server prohibits BIOS startup.

The BIOS image file is not secured and reliable because it fails to verify the validity or integrity of the BIOS image file. Therefore, the BIOS is forbidden to start.

In the example embodiment of the present disclosure, first, the data server may obtain the BIOS image file to be started, and verify the validity of the BIOS image file according to the private key signature of the BIOS management server carried in the BIOS image file, and verify that the BIOS image file has integrity according to the first file parameter, thereby determining that the BIOS image file to be booted is safe and reliable, reducing the possibility of booting tampered or corrupted BIOS image files, and improving the security and reliability of the data server.

Second, the data server may calculate the second file parameter of the BIOS image file to be started, compare the second file parameter with the pre-stored first file parameter store. Both the second file parameter and the first file parameter carry the private key signature of the data server, which enables the data server to determine whether the BIOS image file to be launched in the data server is a BIOS image file that has been written in the data server, thereby further reducing the possibility of booting the tampered or corrupted BIOS image file. The security and reliability of the data server are improved.

In addition, the verification process of the BIOS image file is completed locally in the data server, which reduces unnecessary interaction, improves the verification efficiency, and further improves the efficiency of booting the BIOS.

Third Example Embodiment

Figure 3:
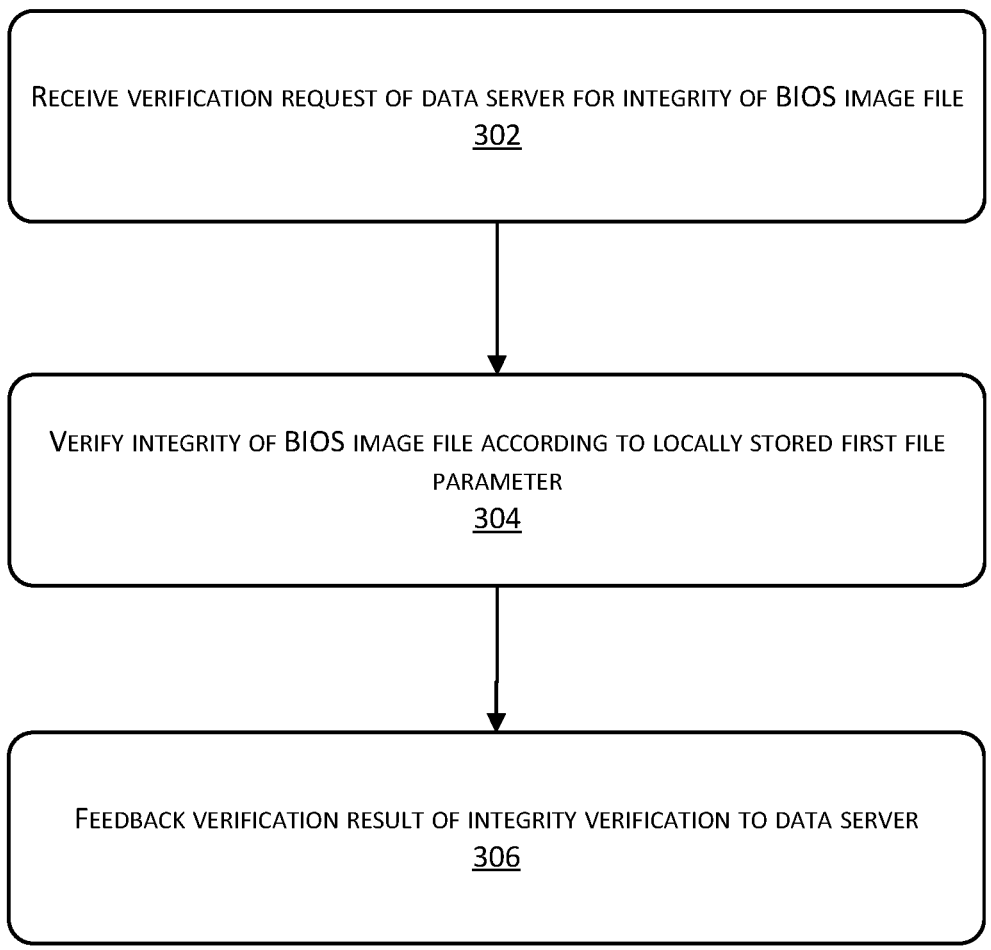
FIG. 3 is a flowchart of a BIOS startup method according to a third example embodiment of the present disclosure.

Referring to FIG. 3, a flowchart of a BIOS startup method according to an example embodiment of the present disclosure is shown. The detailed steps include:

Step 302: Receive a verification request of the data server for the integrity of the BIOS image file.

In order to avoid the problem that the data locally stored at the data server is falsified which causes the difficulty to accurately verify the integrity of the BIOS image file, thereby improving the reliability of verifying the integrity of the BIOS image file and reducing the possibility of booting the tampered or damaged BIOS image file, the server may verify the BIOS image file to be started through the server.

The verification request is used to request the BIOS management server to perform integrity verification on the BIOS image file to be started by the data server. The verification request may carry data that describes the integrity of the BIOS image file, such as the first file parameter.

Step 304: Verify the integrity of the BIOS image file according to the locally stored first file parameter.

The manner in which the BIOS management server verifies the integrity of the BIOS image file according to the first file parameter may be the same as the manner in which the data server verifies the integrity of the BIOS image file according to the first file parameter, and thus the details are not described herein for brevity.

Step 306: Feedback the verification result of the integrity verification to the data server.

In order to facilitate the data server to determine whether to start the BIOS image file, the BIOS server may notify the data server of the verification result of the integrity verification.

The verification result may include verification success or verification failure. If it is successful, the data server may start the BIOS image file, and if it fails, the data server may prohibit starting the BIOS image file.

In this example embodiment, the verification request of the data server for the integrity of the BIOS image file is received. The integrity of the BIOS image file is verified according to the locally stored first file parameter, and the verification result is fed back to the data server. Thus, the data server may determine whether the BIOS image file to be started is secured and reliable according to the verification result. If the BIOS image file passes the verification, the probability that the BIOS image file has been tampered with or damaged is low and may be started. That is, the possibility of booting a corrupted or corrupted BIOS image file is reduced, thereby improving the security and reliability of the data server.

Fourth Example Embodiment

Figure 4:
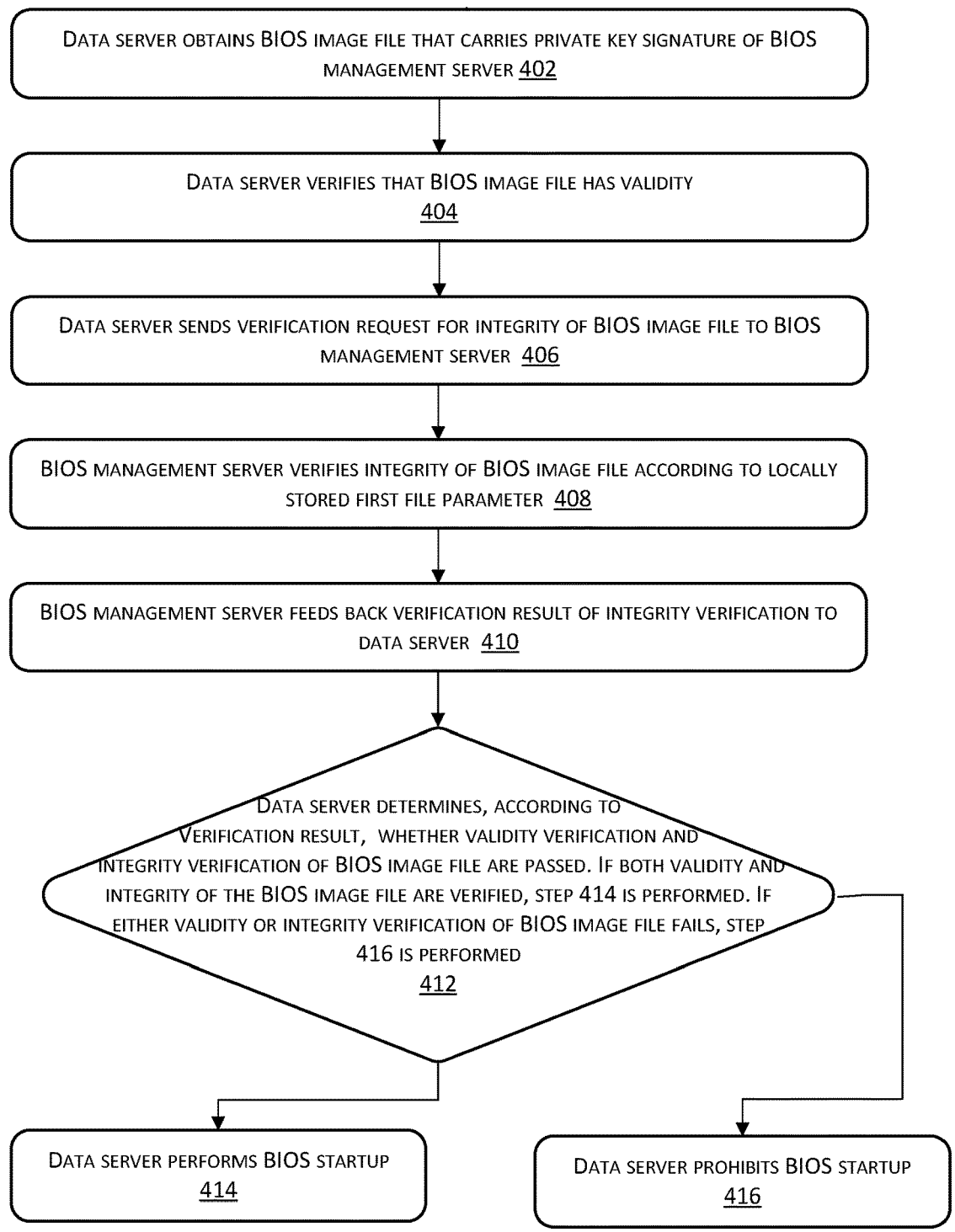
FIG. 4 is a flowchart of a BIOS startup method according to a fourth example embodiment of the present disclosure.

Referring to FIG. 4, a flowchart of a method for booting a BIOS according to an example embodiment of the present disclosure is shown, which is applied to interaction between a data server and a BIOS management server, and the detailed steps include:

Step 402: The data server obtains a BIOS image file, wherein the BIOS image file carries a private key signature of the BIOS management server.

The manner in which the data server obtains the BIOS image file may refer to the related foregoing description, and the details are not described herein for brevity.

Step 404: The data server verifies that the BIOS image file has validity.

The manner in which the data server verifies the validity of the BIOS image file may refer to the related foregoing description, and the details are not described herein for brevity.

Step 406: The data server sends a verification request for the integrity of the BIOS image file to the BIOS management server.

In the example embodiment of the present disclosure, optionally, in order to accurately describe the overall content of the BIOS image file to be started by the data server so that the BIOS may perform the integrity verification on the BIOS image file quickly and accurately, the verification request carries the second file parameter generated by the data server according to the BIOS image file.

The manner that the data server generates the second parameter according to the BIOS image file may refer to the related foregoing description, and the details are not described herein for brevity.

In the example embodiment of the present disclosure, optionally, in order to ensure the security and reliability of data transmission with the BIOS, to ensure the security and reliability of the BIOS startup process, when sending an authentication request to the BIOS management server, the data server may also send the security certificate of the data server to the BIOS management server.

Among them, the security certificate is used to indicate that the device with the security certificate is secure and credible. The data server or the BIOS management server may obtain the corresponding security certificate from the foregoing third party device. Certainly, third party devices may store security certificates for third-party devices.

Certainly, in practical applications, the verification request may also include other information, such as a device identifier of the data server.

The device identifier is used to uniquely describe a device, and the device identifier may include a factory serial number or name of the device.

In the example embodiment of the present disclosure, in order to further facilitate the BIOS management server to accurately verify the integrity of the BIOS image file, ensure that the BIOS image file to be started by the data server is a previously written BIOS image file, and reduce the possibility of starting the falsified or damaged BIOS image file, the data server may sign the second file parameter according to the private key of the data server. That is, the second file parameter carries the private key signature of the data server.

The manner in which the data server signs the second file parameter according to the private key of the data server may refer to the related foregoing description, and the details are not described herein for brevity.

In the example embodiment of the present disclosure, optionally, in order to ensure that the BIOS management server may verify the validity of the second file parameter, and further improve the accuracy of subsequent integrity verification of the BIOS image file, the data server may sign the second file parameter based on the public key of the BIOS management server. That is, the second file parameter carries the public key signature of the BIOS management server.

The data server may sign the second file parameter according to the public key of the BIOS management server, that is, encrypt the second file parameter according to the public key of the BIOS management server.

Certainly, in the actual application, the verification request for the integrity of the BIOS image file may also carry other information, such as the device identifier or security certificate of the data server.

For example, the data server sends a verification request to the BIOS management server for the integrity of the BIOS image file, and the verification request carries: C, {hash_c}AIKpk_s, wherein C is the device identifier, hash_c={hash(BIOS.ISO)} AIKpriv_c, which is the hash value of the BIOS image file carrying the private key of the data server, AIKpk_s is the public key of the BIOS management server, and S is the device identification of the BIOS management server.

Step 408: The BIOS management server verifies the integrity of the BIOS image file according to the locally stored first file parameter.

The server may obtain the first file parameter of the BIOS image file that is written by the data server from the BIOS configuration file database.

The BIOS configuration file database may be stored in advance by the BIOS management server. The BIOS configuration file database may include a device identifier of the data server, the BIOS image file corresponding to the data server, the image file version information of the BIOS image file, and the first file parameter of the image file carrying the data service.

After successfully writing the BIOS image file into the ROM, the data server may send the first file parameter of the BIOS image file to the BIOS management server, and the BIOS management server stores the first file parameter to the BIOS configuration file database.

For example, the BIOS management server receives the hash_c sent by the data server in advance, and stores the hash_c in the BIOS configuration file database shown in Table 1 below. The first column is the device name of the data server, the second column is the device serial number of the data server, the third column is the version information of the BIOS image file written by the data server, and the fourth column is the BIOS image file written by the data server, the fifth column is the first file parameter that carries the data server's private key signature.

TABLE 1

| . . . . . . | . . . | . . . | . . . |
|---|---|---|---|
| C SN | BIOS_Version | BIOS.ISO | { hash(BIOS.ISO)}AIKpriv_c |
| . . . . . . | . . . | . . . | . . . |

In the example embodiment of the present disclosure, optionally, the first file parameter is stored in advance. For example, the first file parameter of the BIOS image file is obtained and stored when the data server flashes or writes the BIOS image file, and the second file parameter is calculated by the data server according to the BIOS image file to be started. Therefore, in order to accurately verify the BIOS image file, the BIOS management server may verify whether the second file parameter is consistent with the first file parameter. If the two are consistent, the BIOS management server determines that the BIOS image file has integrity. That is, the booted BIOS image file is consistent with the flashed BIOS, and the booted BIOS image file is secured and reliable. Correspondingly, if they are inconsistent, the BIOS management server determines that the BIOS image file does not have integrity. That is, the booted BIOS image file is inconsistent with the flashed BIOS, and the booted BIOS image file is not secured and reliable.

In the example embodiment of the present disclosure, optionally, in order to further facilitate the BIOS management server to accurately verify the complete BIOS image file, ensure that the BIOS image file to be started by the data server is the previously saved BIOS image file, and reduce the possibility of booting a tampered or corrupted BIOS image file, the first file parameter carries the private key signature of the data server. Correspondingly, the BIOS management server may compare the first file parameter carrying the private key signature of the data server with the second file parameter carrying the private key signature of the data server.

In the example embodiment of the present disclosure, optionally, in order to ensure that the second file parameter has not been tampered with or damaged, improve the reliability of the integrity verification of the BIOS image file, and reduce the possibility of safe problems brought by the tampered or corrupted data to the BIO management server (that is, to improve the security of the BIOS management server), before verifying whether the second file parameter is consistent with the first file parameter, the BIOS management server may verify the validity of the second file parameter according to the private key of the BIOS management server.

The BIOS management server may decrypt the received data according to the private key of the BIOS management server to verify the validity of the received data.

For example, the information that the BIOS management server receives from the verification request is: C, {hash_c}AIKpk_s. The BIOS management server performs validity verification on {hash_c}AIKpk_s according to AIKpriv_s. The verification succeeds and the BIOS management server decrypts and obtains hash_c, and the hash_c is the second file parameter {hash(BIOS.ISO)}AIKpriv_c, in which AIKpriv_s is the private key of the BIOS management server. The BIOS management server obtains the first file parameter corresponding to the data server from the above table 1 as {hash(BIOS.ISO)}AIKpriv_c, and compares the first file parameter with the second file parameter to determine that the first file parameter is the same as the second file parameter. That is, the integrity verification of the BIOS to be started by the data server is passed.

Certainly, if the data server also sends the security certificate of the data server to the BIOS management server, the BIOS management server may first verify the validity of the data server's security certificate, and then verify the data according to the first file stored locally. The BIOS management server verifies the integrity of the BIOS image file according to the locally stored first file parameter after the verification of the validity succeeds, and notifies the data server that the verification of the integrity fails so that the data server performs the step 416.

Step 410: The BIOS management server feeds back the verification result of the integrity verification to the data server.

The BIOS management server may send the verification result to the data server, including the confirmation information that the verification succeeds, or the verification failure information.

Certainly, when the BIOS management server feeds back the verification result to the data server, the security certificate of the BIOS management server may also be sent to the data server, so that the data server performs validity verification on the security certificate of the BIOS management server.

Step 412: The data server determines, according to the verification result, whether the validity verification and the integrity verification of the BIOS image file are passed. If both the validity and integrity of the BIOS image file are verified, step 414 is performed. If either the validity or integrity verification of the BIOS image file fails, step 416 is performed.

If the data server receives the confirmation information fed back by the BIOS management server that the second file parameter is consistent with the first file parameter, the data server determines that the BIOS image file has integrity. Correspondingly, if the data server receives the verification failure information fed back by the BIOS management server that the second file parameter is inconsistent with the first file parameter, the data server determines that the BIOS image file does not have integrity.

Step 414: the data server performs BIOS startup.

Step 416: the data server prohibits BIOS startup.

In the example embodiment of the present disclosure, first, the BIOS management server may receive a verification request of the data server for the integrity of the BIOS image file, thereby verifying the integrity of the BIOS image file according to the locally stored first file parameter, and return the verification result to the data server. Thus the data server may determine whether the BIOS image file to be started is secured and reliable according to the verification result. If the BIOS image file passes the verification, the probability that the BIOS image file has been tampered with or damaged is low and is started. That is, the possibility of booting a tamper-proof or damaged BIOS image file is reduced, and the security and reliability of the data server are improved.

Secondly, before the integrity verification of the BIOS image file, the BIOS management server may verify the validity of the data sent by the data server through the private key of the BIOS management server, ensuring that the second file parameter has not been tampered with or damaged, thereby improving the reliability of the integrity verification of the BIOS image file and also reducing the possibility of the security problem that is caused by tampered or damaged data to the BIOS management server. That is, the security of the BIOS management server is improved.

In addition, the BIOS management server may verify the integrity of the BIOS image file. That is, the BIOS image file is verified by a device other than the data server, so as to avoid the problem of accurately verifying the integrity of the BIOS image file due to the concern that the locally stored data of the data server is falsified, thereby further improving the security and reliability of the data server.

Fifth Example Embodiment

Figure 5:
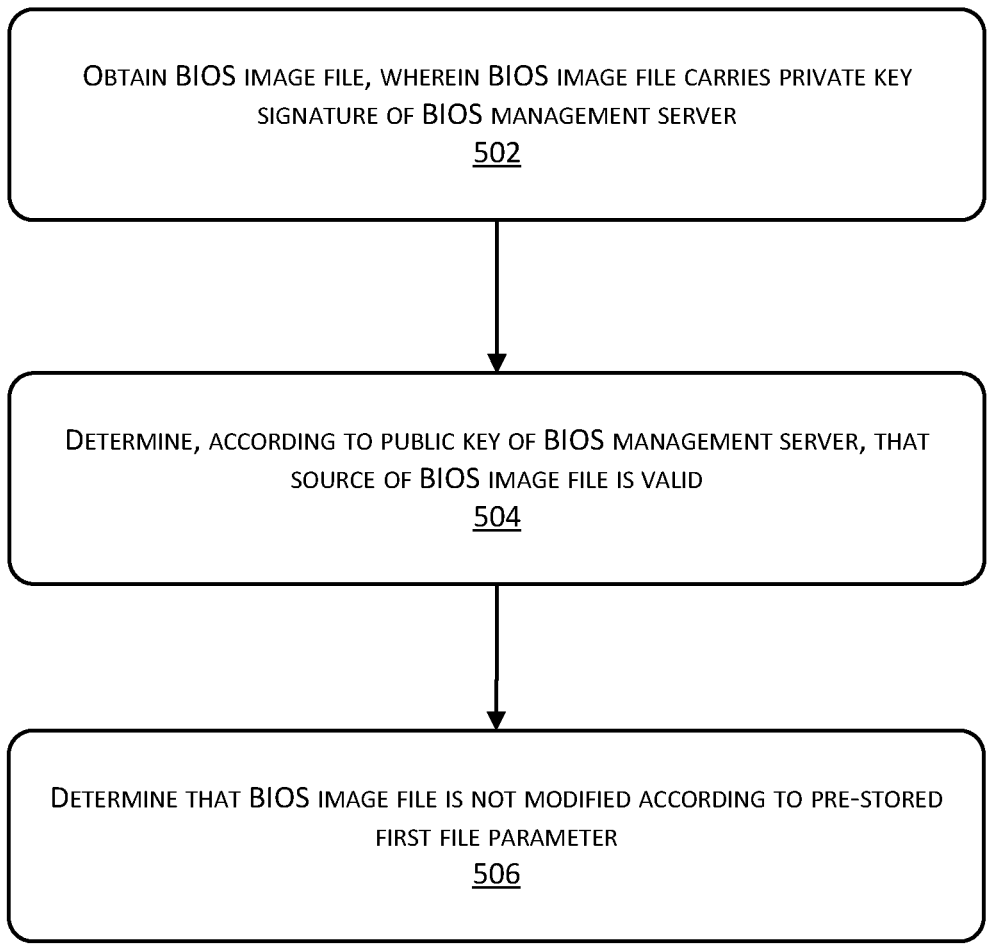
FIG. 5 is a flowchart of a data processing method according to a fifth example embodiment of the present disclosure.

Referring to FIG. 5, a flowchart of a data processing method according to an example embodiment of the present disclosure is shown. The detailed steps include:

Step 502: Obtain a BIOS image file, wherein the BIOS image file carries a private key signature of the BIOS management server.

The computing devices usually need to obtain data from other devices, such that the data server needs to obtain the BIOS image file from the BIOS management server and the BIOS management server needs to obtain the BIOS image file from the BIOS providing server. The unsafe data (including the data that has an unsure source or is tampered) may pose a security risk to the computing devices. Therefore, the security and reliability of the computing device need to be improved. The computing devices may obtain the BIOS image file that carries the private key signature of the BIOS management server, so as to facilitate the subsequently determination whether the BIOS image file is secured and reliable.

In the example embodiment of the present disclosure, the BIOS image file is taken as an example to describe that the computing device acquires data and processes the acquired data according to the following steps. In actual applications, the computing device may process any obtained data according to the same method.

The source of the private key signature of the BIOS management server carried in the BIOS image file may refer to the related foregoing description, and no further details are provided herein for brevity.

Step 504: Determine, according to a public key of the BIOS management server, that the source of the BIOS image file is valid.

The data encrypted by the private key of the BIOS management server may only be decrypted by the public key of the BIOS management front server. Therefore, the BIOS image file may be decrypted by the public key of the BIOS management server. If the description is successful, the BIOS image file is determined to be from the BIOS management server, i.e., the source of the BIOS image file is valid.

Step 506: Determine that the BIOS image file is not modified according to the pre-stored first file parameter.

If the BIOS image file has not been modified, the overall content of the BIOS image file is complete and the possibility that the BIOS image file includes the unsafe factors such as Trojan virus is low. That is, the BIOS image file is secured and reliable, which is convenient for the computing device to have other processing to the BIOS image files, such as storing or forwarding to other devices.

The computing device may obtain the file parameters of the BIOS image file from the BIOS management server for storage.

The computing device may generate a second file parameter of the BIOS image file and compare the first file parameter with the second file parameter. If they are consistent, the BIOS image file is determined to be unmodified.

In the example embodiment of the present disclosure, optionally, in order to enable the computing device to operate normally and improve the security and reliability of the computing device, the computing device may perform BIOS startup. That is, the possibility that the computing device starts a tampered or damaged BIOS image file is reduced.

The manner in which the computing device starts the BIOS may refer to the related foregoing description, and the details are not described herein for brevity.

In the example embodiment of the present disclosure, since the obtained BIOS image file carries the private key signature of the BIOS management server, the source of the BIOS image file may be determined according to the public key of the BIOS management server, thereby determining the process of obtaining the BIOS image file is secured and reliable. The pre-stored BIOS image file is used to determine that the BIOS image file is not modified, thereby ensuring that the BIOS image file is intact and has not been tampered with or damaged, reducing the possibility that the computing device obtains unsecured data, and improving the security and reliability of the computing device.

Secondly, for the BIOS image file that has been determined to be safe, the computing device may start the BIOS, thereby reducing the possibility that the computing device starts the tampering or damaged BIOS image file and improving the security and reliability of the computing device.

It should be understood by one of ordinary skill in the art that the method steps in the example embodiments herein are not indispensable, and in a specific case, one or more steps may be omitted as long as the technical purpose of booting the BIOS may be achieved. The present disclosure does not limit the number of steps and the order of the steps in the example embodiments.

In order to facilitate one of ordinary skill in the art to better understand the present disclosure, the BIOS flash writing method, the BIOS image file processing method, and the BIOS booting method of the example embodiments of the present disclosure are described below through several specific examples:

Example One

Figure 6:
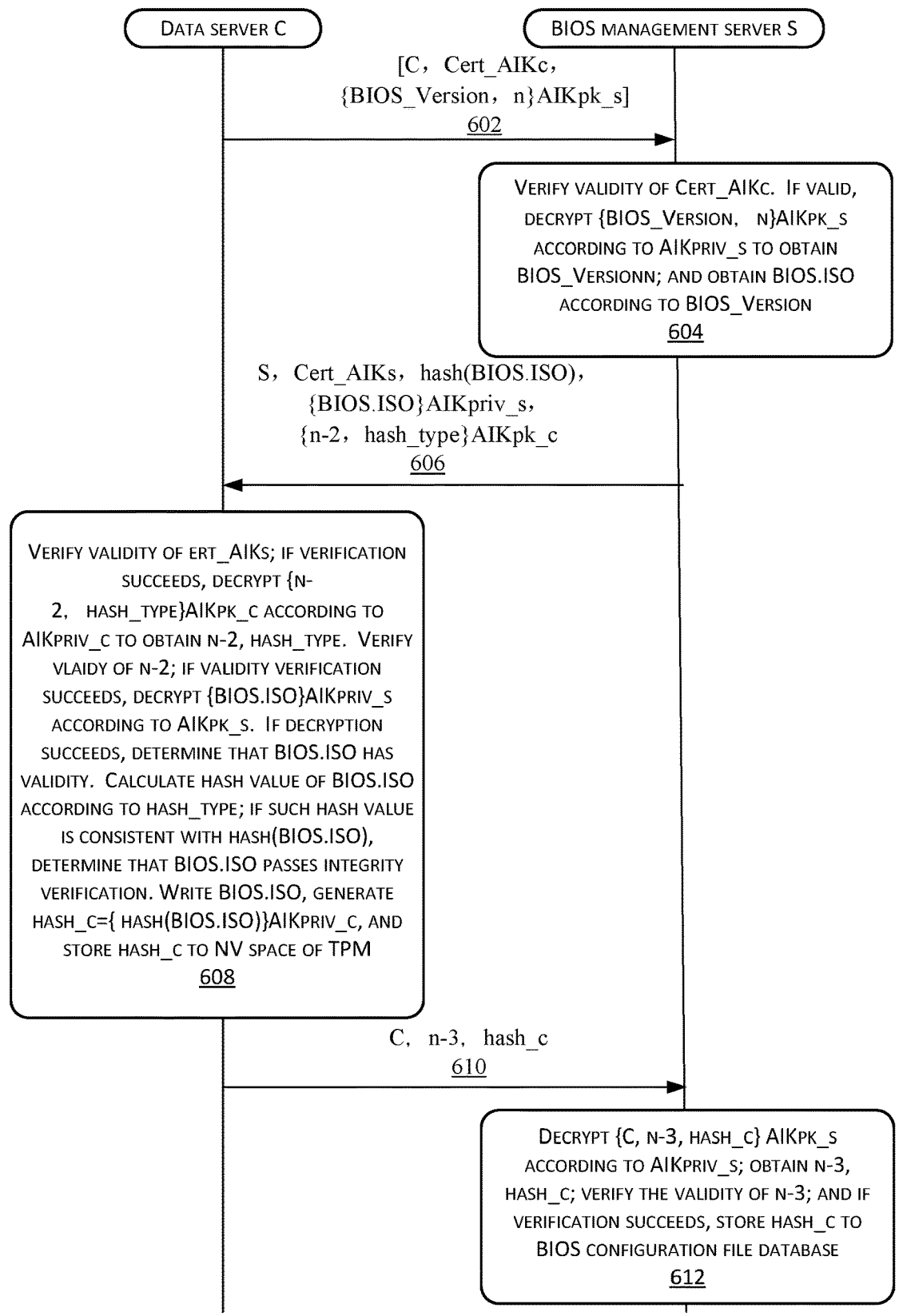
FIG. 6 is a timing sequence diagram of a BIOS writing method according to an example embodiment of the present disclosure.

Referring to FIG. 6, a timing sequence diagram of a BIOS flash writing method is provided. The method may be used for interaction between a data server C and a BIOS management server S, and the detailed steps include the following:

Step 602: C sends [C, Cert_AIKc, {BIOS_Version, n} AIKpk_s] to S.

Cert_AIKc represents the security certificate of C. BIOS_Version represents the version of the BIOS image file, which is used to describe the version of the BIOS image file. n represents a random number of the second verification parameter, which may be formed by C according to the random number generation algorithm agreed with S beforehand and used for the subsequent verification of C to ensure that the process of obtaining the BIOS image file is secured and reliable.

Step 604: S receives the information sent by C, and verifies the validity of Cert_AIKc. If it is vaild, S decrypts {BIOS_Version, n}AIKpk_s according to AIKpriv_s to obtain BIOS_Version, n, and obtains BIOS.ISO according to BIOS_Version.

Step 606: S sends [S, Cert_AIKs, hash (BIOS. ISO), {BIOS.ISO} AIKpriv_s, {n-2, hash_type} AIKpk_c] to C.

n-2 represents a random number of the first verification parameter and may be generated by S according to a random number generation algorithm agreed with C in advance and n, and is used for C for verification to ensure that the process of obtaining the BIOS image file is secured and reliable. hash_type represents the file parameter algorithm identifier. AIKpk_c represents the public key of C. {n-2, hash_type} AIKpk_c represents the first vertification parameter and file parameter algorithm identifier of the public key signature of C.

Step 608: C receives the information sent by the S, and verifies the validity of the Cert_AIKs. If the verification succeeds, the {n-2, hash_type} AIKpk_c is decrypted according to AIKpriv_c to obtain n-2, hash_type. C verifies the validity of n-2. If such validity verification succeeds, C decrypts the {BIOS.ISO}AIKpriv_s according to AIKpk_s. If the decryption succeeds, the BIOS.ISO is determined to have validity, and C calculates the hash value of BIOS.ISO according to hash_type. If the hash value is consistent with hash (BIOS.ISO), the integrity verification of the BIOS.ISO is determined to pass. C writes BIOS.ISO, generate hash_c={hash(BIOS.ISO)}AIKpriv_c, and store hash_c to the NV space of the TPM.

Cert_AIKs represents the security certificate of S.

The integrity and validity of the BIOS writing program may be verified before writing the BIOS.ISO.

Step 610: C sends {C, n-3, hash_c} AIKpk_s to S.

The random number, which is the third verification parameter, is generated by the data server according to n or n-2, and is used for subsequent verification by S to ensure that the process of obtaining the BIOS image file is secured and reliable.

Step 612, S receives the information of C, decrypts {C, n-3, hash_c} AIKpk_s according to AIKpriv_s; obtains n-3, hash_c; verifies the validity of n-3; and if the verification succeeds, stores hash_c to the BIOS configuration file database.

Example Two

Figure 7:
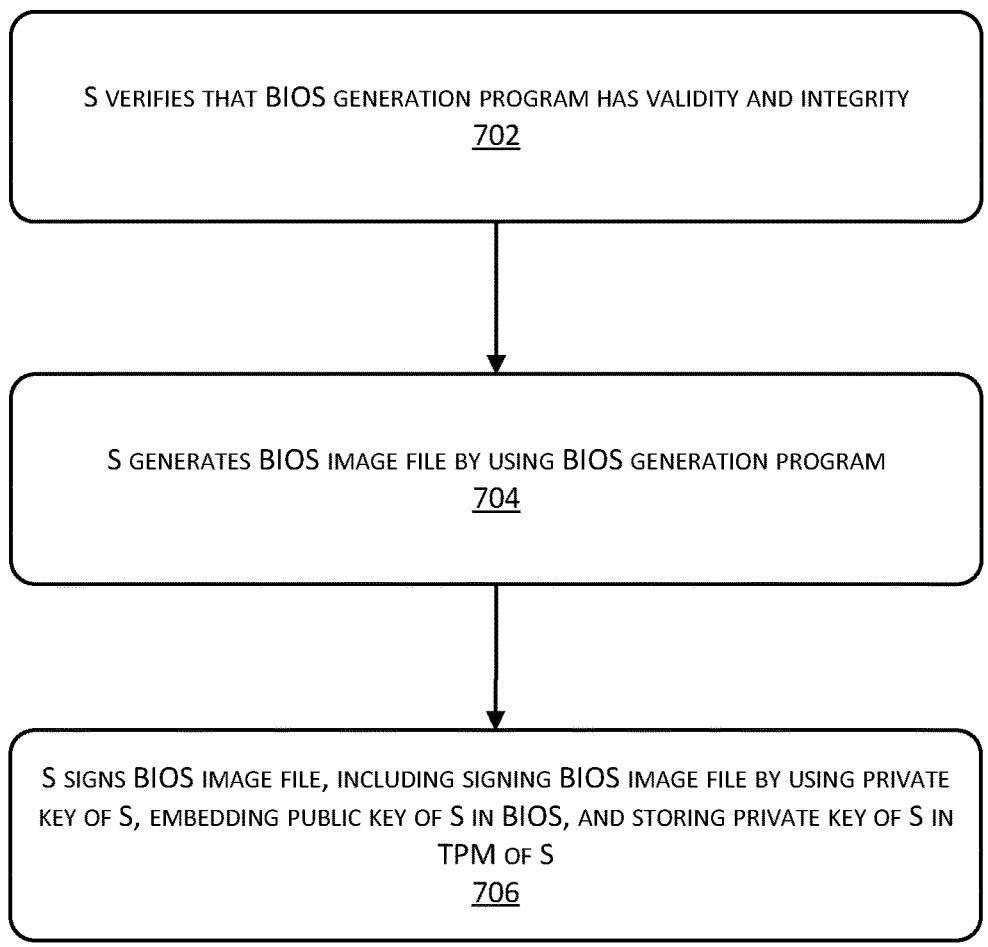
FIG. 7 is a flowchart of a method for processing a BIOS image file according to an example embodiment of the present disclosure.

Referring to FIG. 7, a flowchart of a processing method of a BIOS image file is provided. The method may be used in the BIOS management server S, and the detailed steps include the following:

Step 702: S verifies that the BIOS generation program has validity and integrity.

Step 704: S generates a BIOS image file by using the BIOS generation program.

In addition, if S is to obtain the BIOS image file provided by BIOS from the BIOS providing server, the foregoing step of generating the BIOS image file may not be performed, so that step 706 is directly executed according to the BIOS image file obtained from the BIOS providing server.

Step 706: S signs the BIOS image file, including signing the BIOS image file by using the private key of the S, embedding the public key of the S in the BIOS, and storing the private key of the S in the TPM of the S.

If the BIOS image file is provided by the BIOS vendor, the BIOS providing server may use the BIOS providing server's private key to sign the BIOS image file, that is, {BIOS.ISO}AIKpriv_oem, and provide the mirror version information of the BIOS image file, hash value, and algorithm type of hash value, etc. Therefore, S may decrypt the {BIOS.ISO}AIKpriv_oem according to the public key AIKpk_oem of the BIOS providing server to obtain the BIOS.ISO. That is, the BIOS.ISO is determined to be valid. S calculates the hash value of BIOS.ISO according to the provided algorithm type of hash value, and compares the calculated hash value with the provided hash value. If the two are consistent, BIOS.ISO is determined to have integrity. After the verification passes, step 603 may be performed to achieve the purpose that the BIOS is self-controlled subsequently.

Through the above example one and example two, the process of obtaining the BIOS image file by C from S and the process of providing the BIOS image file to C by S are illustrated. Next, by using the example 3 and the example 4, the BIOS startup is taken as an example to illustrate the process of integrity verification and validity verification of the BIOS image file that have been written by C in the subsequent operation and maintenance process.

Example Three

Figure 8:
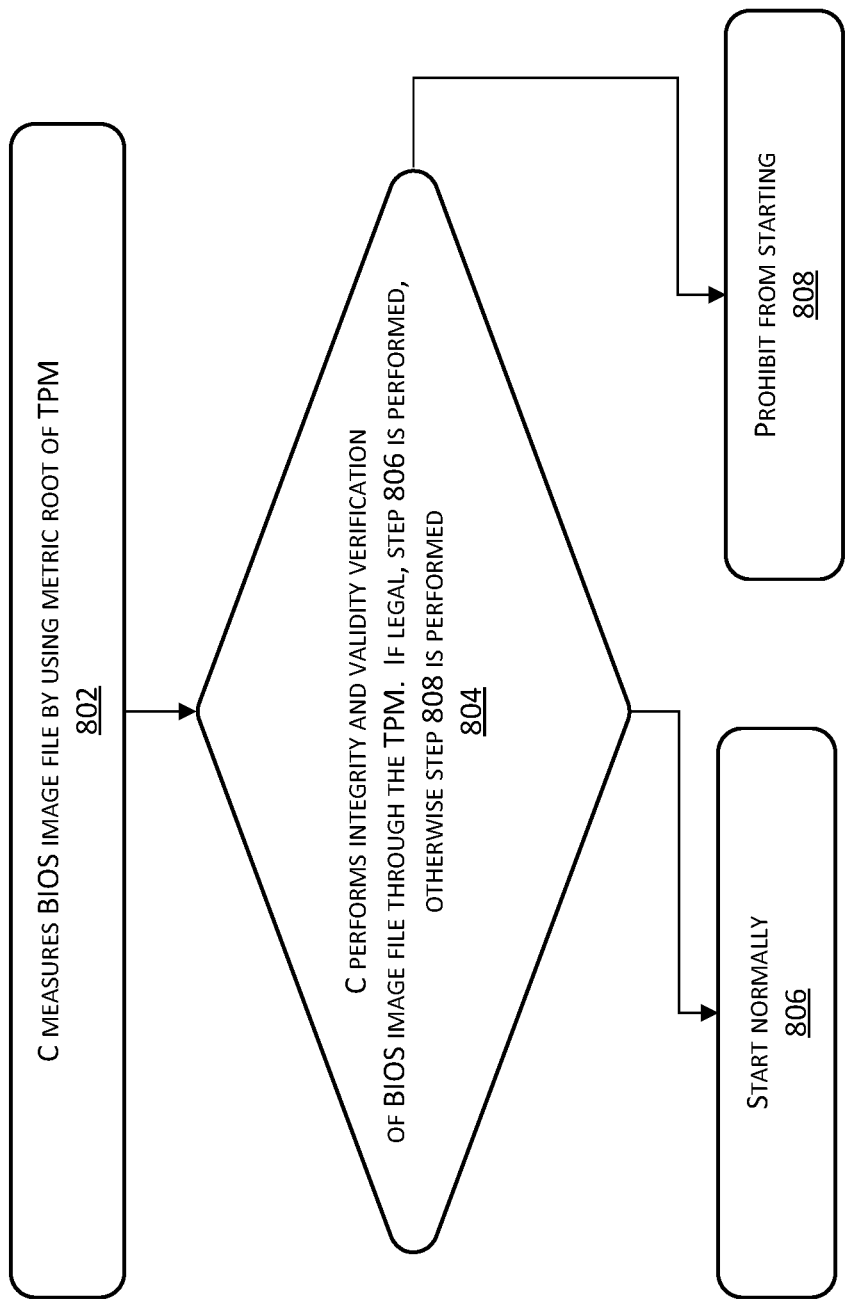
FIG. 8 is a flowchart of a BIOS startup method according to an example embodiment of the present disclosure.

Referring to FIG. 8, a flowchart of a BIOS startup method is provided. The method may be used in the data server C, and the detailed steps include the following:

Step 802: C measures the BIOS image file by using the metric root of the TPM, and obtains a hash value of the BIOS image file to be started, that is, hash (BIOS.ISO), and signs the hash (BIOS.ISO) by AIKpriv_c to obtain {hash (BIOS.ISO)} AIKpriv_c.

Step 804: C performs integrity and validity verification of the BIOS image file through the TPM. If legal, step 806 is performed, otherwise step 808 is performed.

C may compare the hash value obtained from the foregoing calculation with the hash value of the pre-stored BIOS image file carrying private key signature of C. If they are consistent, the verification result is determined to be legal; otherwise the verification result is determined to be illegal.

Step 806, the BIOS is started normally.

Step 808, the BIOS is prohibited from starting.

Example Four

Figure 9:
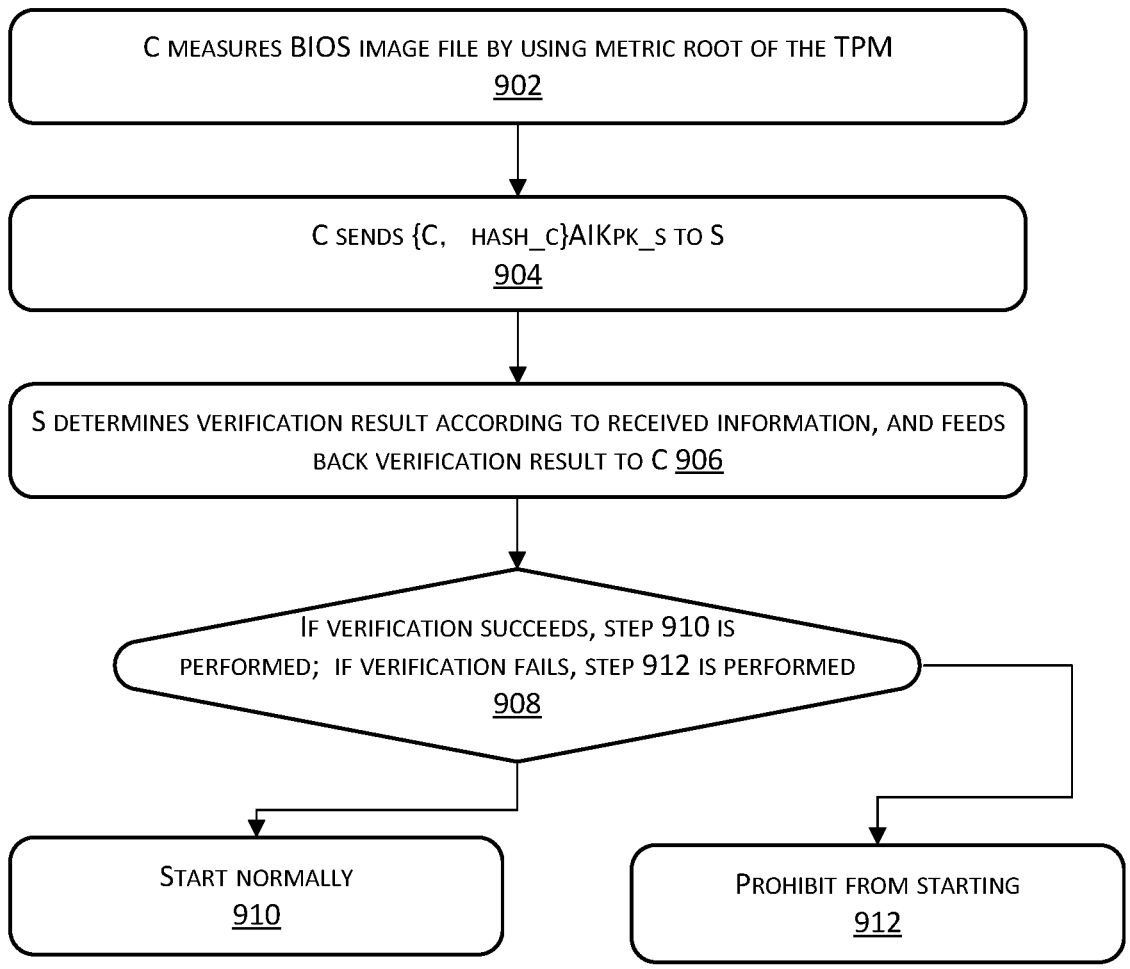
FIG. 9 is a flowchart of another BIOS startup method according to an example embodiment of the present disclosure.

Referring to FIG. 9, a flowchart of a BIOS startup method is provided. The method may be used in the interaction between the data server C and the BIOS management server, and the detailed steps include the following:

Step 902: C measures the BIOS image file by using the metric root of the TPM, obtains a hash value of the BIOS image file to be started, signs the hash (BIOS.ISO) by AIKpriv_c to obtain {hash(BIOS.ISO)}AIKpriv_c, and obtains the measurement result that is hash_c.

Step 904, C sends {C, hash_c} AIKpk_s to S.

Step 906: S determines the verification result according to the received information, and feeds back the verification result to C.

After receiving the {C, hash_c}AIKpk_s sent by C, S decrypts {C, hash_c}AIKpk_s according to AIKpriv_s, and obtains C and hash_c, and compares such hash_C with hash_C in the BIOS configuration file database. If they are consistent, the verification passes; otherwise, the verification fails.

Step 908: If the verification succeeds, step 910 is performed; if the verification fails, step 912 is performed.

Step 910: the BIOS is started normally.

Step 912, the BIOS is prohibited from starting.

Sixth Example Embodiment

Figure 10:
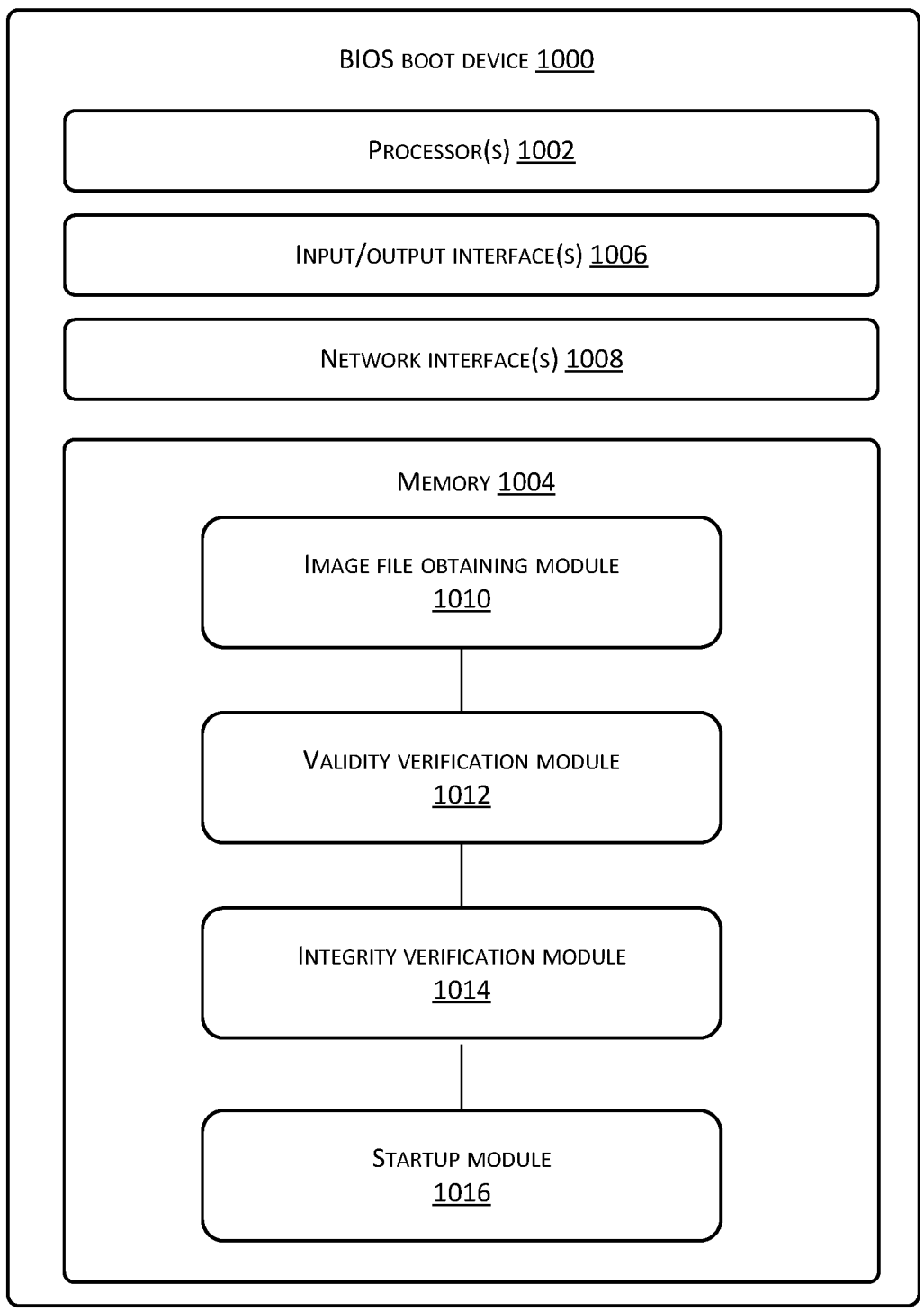
FIG. 10 is a structural block diagram of a BIOS boot device according to a sixth example embodiment of the present disclosure.

Referring to FIG. 10, a BIOS boot device 1000 according to an example embodiment of the present disclosure is provides. The device 1000 includes one or more processor(s) 1002 or data processing unit(s) and memory 1004. The device 1000 may further include one or more input/output interface(s) 1006 and one or more network interface(s) 1008. The memory is an example of the computer readable medium or media.

The computer readable medium includes non-volatile and volatile media as well as movable and non-movable media, and may implement information storage by means of any method or technology. Information may be a computer readable instruction, a data structure, a module of a program, or other data. For example, a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission media, and may be used to store information accessible to the computing device. According to the definition in this text, the computer readable medium does not include transitory media, such as modulated data signals and carriers.

The memory 1004 may store therein a plurality of modules or units including:

an image file obtaining module 1010 that is configured to obtain a BIOS image file, wherein the BIOS image file carries a private key signature of the BIOS management server;

a validity verification module 1012 that is configured to verify that the BIOS image file has validity according to a public key of the BIOS management server;

an integrity verification module 1014 that is configured to verify that the BIOS image file has integrity according to the first file parameter stored in advance; and a startup module 1016 that is configured to perform BIOS startup if both the validity and integrity of the BIOS image file are verified.

Optionally, the device 1000 further include the following module stored on the memory 1004:

a startup prohibition module (not shown in FIG. 10) that is configured to prohibit the BIOS from starting if either the validity or integrity verification of the BIOS image file fails.

Optionally, the integrity verification module 1014 includes the following sub-modules (not shown in FIG. 10):

a file parameter generating sub-module configured to generate a corresponding second file parameter according to the BIOS image file; and a file parameter verification sub-module configured to verify whether the second file parameter is consistent with the first file parameter, and if the two are consistent, determine that the BIOS image file has integrity.

Optionally, the first file parameter carries a private key signature of the data server, and the integrity verification module further includes:

a signature sub-module configured to sign the second file parameter according to a private key of the data server.

Optionally, the integrity verification module further includes:

a file parameter obtaining sub-module configured to obtain the first file parameter from the local storage.

Optionally, the first file parameter is stored in the BIOS management server, and the file parameter verification sub-module is further configured to:

send the second file parameter to the BIOS management server; and determine that the BIOS image file has integrity if the second file parameter fed back by the BIOS management server is consistent with the first file parameter.

Optionally, the file parameter verification sub-module is further configured to sign the second file parameter according to the public key of the BIOS management server.

In the example embodiment of the present disclosure, the BIOS image file to be started may be obtained, and the validity of the BIOS image file is verified according to the private key signature of the BIOS management server carried in the BIOS image file, and the integrity of the BIOS image file is verified according to the first file parameter. The BIOS image file to be started is determined to be secured and reliable according to the verification result. If the BIOS image file passes the verification, the probability that the BIOS image file has been tampered with or damaged is low and may be started. That is, the possibility that starts the tampered or damaged BIOS image file is reduced, which improves the security and reliability of the data server.

Seventh Example Embodiment

Figure 11:
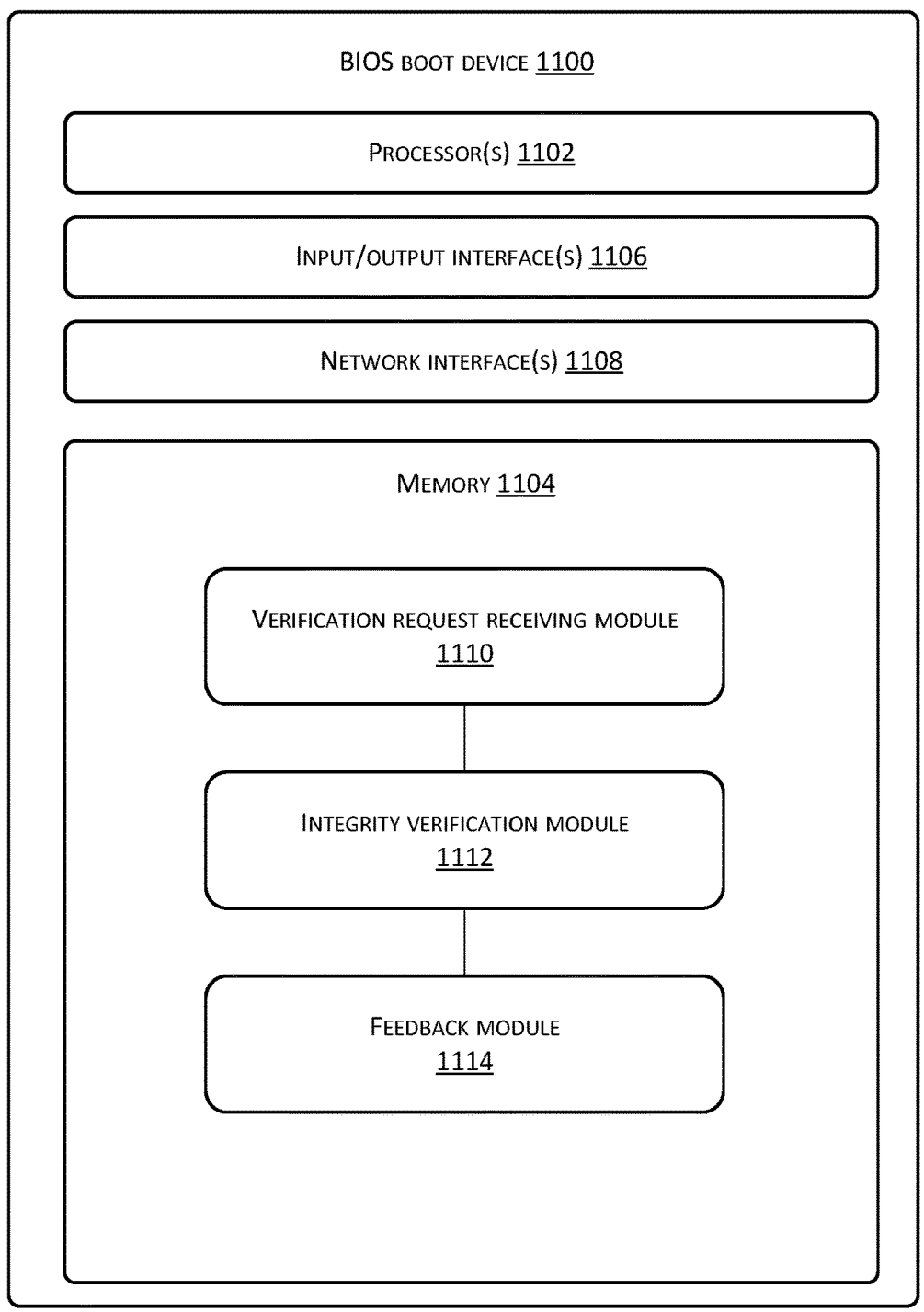
FIG. 11 is a structural block diagram of a BIOS boot device according to a seventh example embodiment of the present disclosure.

Referring to FIG. 11, a BIOS boot device 1100 according to an example embodiment of the present disclosure is provided. The device 1100 includes one or more processor(s) 1102 or data processing unit(s) and memory 1104. The device 1100 may further include one or more input/output interface(s) 1106 and one or more network interface(s) 1108. The memory is an example of the computer readable medium or media.

The memory 1104 may store therein a plurality of modules or units including:

a verification request receiving module 1110 configured to receive a verification request of the data server for the integrity of the BIOS image file;

an integrity verification module 1112 configured to verify the integrity of the BIOS image file according to the locally stored first file parameter; and a feedback module 1114 configured to feed back the verification result of the integrity verification to the data server.

Optionally, the verification request carries a second file parameter generated by the data server according to the BIOS image file, and the integrity verification module 1112 includes the following sub-module (not shown in FIG. 11):

a file parameter verification sub-module configured to determine whether the second file parameter is consistent with the first file parameter and determines that the BIOS image file has integrity if the two are consistent.

Optionally, the first file parameter and the second file parameter both carry a private key signature of the data server.

Optionally, the integrity verification module 1112 further includes the following sub-module (not shown in FIG. 11):

a validity verification sub-module configured to verify validity of the second file parameter according to the private key of the BIOS management server.

In this example embodiment, the verification request from the data server for the integrity of the BIOS image file is received. The integrity of the BIOS image file is verified according to the locally stored first file parameter, and the verification result is fed back to the data server. Thus, the data server may determine whether the BIOS image file to be started is secured and reliable according to the verification result. If the BIOS image file passes the verification, the probability that the BIOS image file has been tampered with or damaged is low and may be started. That is, the possibility that starts a tampered or damaged BIOS image file is reduced, thereby improving the security and reliability of the data server.

Eighth Example Embodiment

Figure 12:
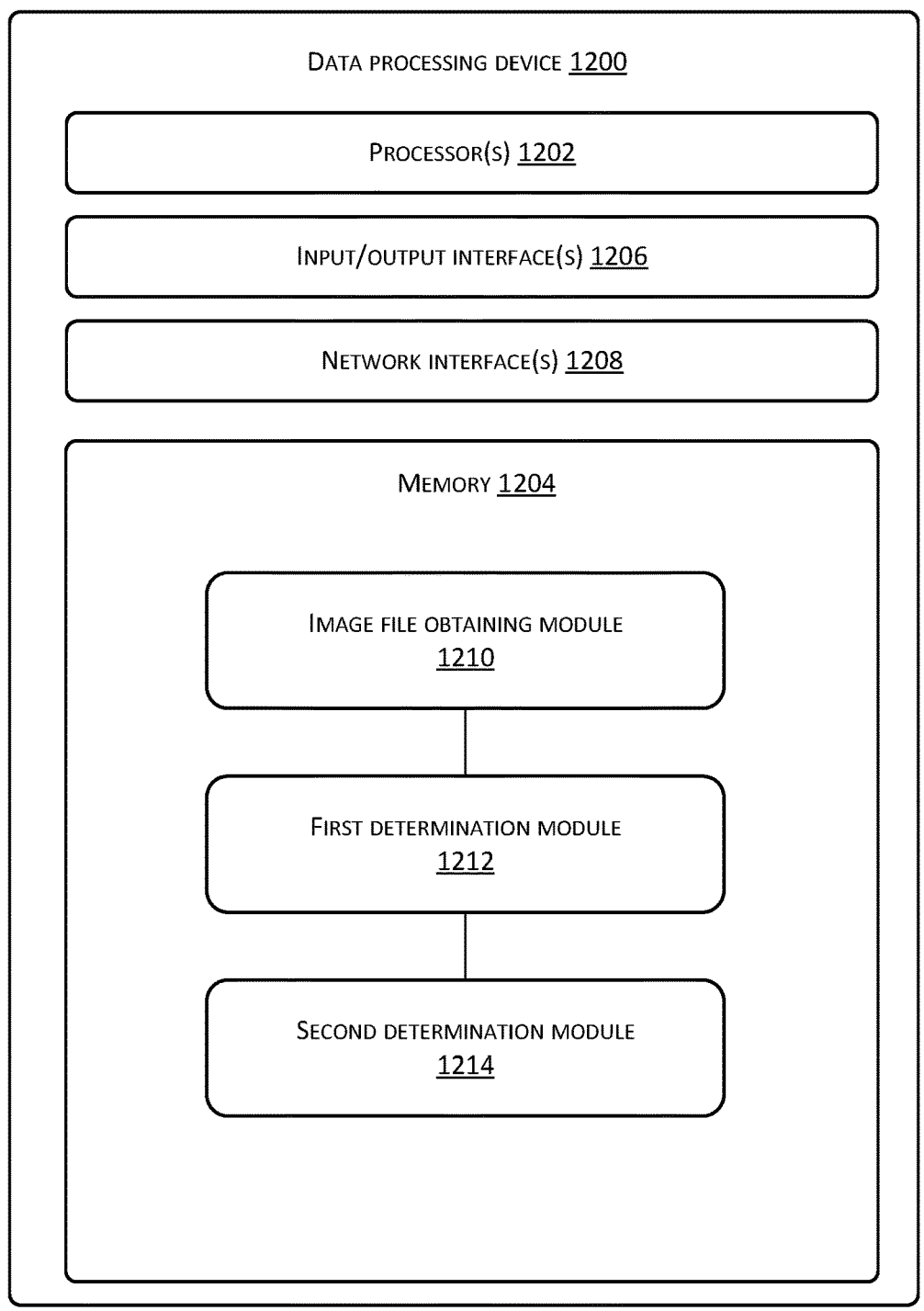
FIG. 12 is a structural block diagram showing the structure of a data processing apparatus according to an eighth example embodiment of the present disclosure.

Referring to FIG. 12, a data processing device 1200 according to an example embodiment of the present disclosure is provided. The device 1200 includes one or more processor(s) 1202 or data processing unit(s) and memory 1204. The device 1200 may further include one or more input/output interface(s) 1206 and one or more network interface(s) 1208. The memory is an example of the computer readable medium or media.

The memory 1204 may store therein a plurality of modules or units including:

an image file obtaining module 1210 configured to obtain a BIOS image file, wherein the BIOS image file carries a private key signature of the BIOS management server;

a first determining module 1212 configured to determine, according to a public key of the BIOS management server, that the source of the BIOS image file is valid; and a second determining module 1214 configured to determine that the BIOS image file is not modified according to the pre-stored first file parameter.

Optionally, the device 1200 further includes a starting module (not shown in FIG. 12) that starts the BIOS.

In the example embodiment of the present disclosure, since the obtained BIOS image file carries the private key signature of the BIOS management server, the source of the BIOS image file may be determined valid according to the public key of the BIOS management server, thereby determining the process of obtaining the BIOS image file is secured and reliable. The BIOS image file is determined not to be modified according to the pre-stored first file parameter, thereby determining that the BIOS image file is intact and has not been tampered with or damaged, reducing the possibility that the computing device obtains the unsafe data, and increasing the security and reliability of the computing device.

With respect to the example device embodiments, since they are basically similar to the example method embodiments, the descriptions are relatively simple, and the relevant parts may be referred to the corresponding descriptions of the example method embodiments.

Figure 13:
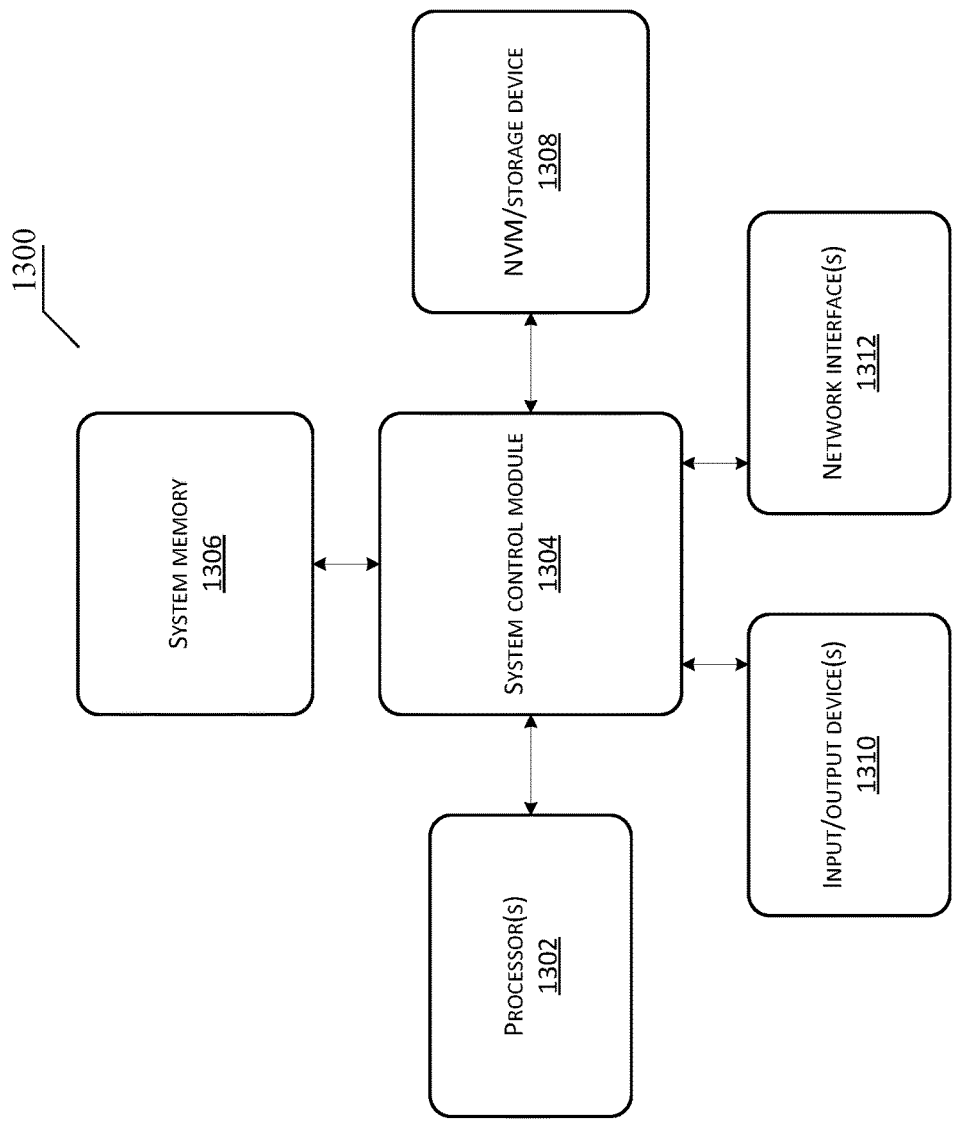
FIG. 13 shows a block diagram of an example system in accordance with one example embodiment of the present disclosure.

The example embodiments of the present disclosure may be implemented as a system for performing a desired configuration using any suitable hardware, firmware, software, or any combination thereof. FIG. 13 illustrates an example system (or device) 1300 that may be used to implement various example embodiments described in this application.

In one example embodiment, FIG. 13 illustrates an example system 1300 having one or more processors 1302, at least one system control module (chipset) 1304 coupled to one or more of the processors 1302, system memory 1306 coupled to the system control module 1304, non-volatile memory (NVM)/storage device 1308 coupled to system control module 1304, one or more inputs/outputs device 1310 coupled to the system control module 1304, and one or more network interface(s) 1312 that is coupled to the system control module 1304.

The processors 1302 may include one or more single or multiple core processors, and the processors 1302 may comprise any combination of general purpose or special purpose processors (e.g., graphics processors, application processors, baseband processors). In some example embodiments, the system 1300 may function as the data server or BIOS management server described in the example embodiments of the present disclosure.

In some example embodiments, the system 1300 may include one or more computer readable media (e.g., system memory 1306 or NVM/storage device 1308) having stored instructions, and one or more processors 1302 that cooperate with the one or more computer readable media and execute the instructions to implement the modules to perform one or more acts described herein.

In an example embodiment, the system control module 1304 may include any suitable interface controller to provide any suitable interface to at least one of the processors 1302 and/or any suitable device or component in communication with the system control module 1304.

The system control module 1304 may include a memory controller module to provide an interface to the system memory 1306. The memory controller module may be a hardware module, a software module, and/or a firmware module.

The system memory 1306 may be used to load and store data and/or instructions for a system such as the system 1300. In an example embodiment, the system memory 1306 may include any suitable volatile memory, such as a suitable DRAM. In some example embodiments, the system memory 1306 may include double data rate type four synchronous dynamic random-access memory (DDR4 SDRAM).

In one example embodiment, the system control module 1304 may include one or more input/output controllers to provide an interface to the NVM/storage device 1308 and one or more input/output devices 1310.

For example, the NVM/storage device 1308 may be used to store data and/or instructions. The NVM/storage device 1308 may comprise any suitable non-volatile memory (e.g., flash memory) and/or may include any suitable non-volatile storage devices (e.g., one or more hard disk drives (HDD), one or more compact disc (CD) drives and/or one or more digital versatile disc (DVD) drives).

NVM/storage device 1308 may include storage resources that are physically part of the device on which system 1300 is installed, or that may be accessible by the device without having to be part of the device. For example, the NVM/storage device 1308 may be accessed through the input/output devices 1310 via the network.

The one or more input/output devices 1310 may provide an interface to the system 1300 to communicate with any other suitable device, and the input/output device 1310 may include a communication component, an audio component, a sensor component, and the like. The network interface 1312 may provide an interface for system 1300 to communicate over one or more networks, and the system 1300 may interact with one or more components in the wireless networks in accordance with any one or more of the wireless network standards and/or protocols, such as WIFI, 2G or 3G, or a combination thereof for wireless communication.

In an example embodiment, at least one of the one or more processors 1302 may be encapsulated with the logic of one or more controllers (e.g., memory controller modules) of the system control module 1304. In an example embodiment, at least one of the one or more processors 1302 may be encapsulated with the logic of one or more controllers of the system control module 1304 to form a system in package (SiP). In an example embodiment, at least one of the one or more processors 1302 may be integrated on the same mold with the logic of one or more controllers of the system control module 1304. In an example embodiment, at least one of the one or more processors 1302 may be integrated with the logic of one or more controllers of the system control module 1304 on the same mold to form a system on a chip (SoC).

In various example embodiments, the system 1300 may be, but is not limited to, a workstation, a desktop computing device, or a mobile computing device (e.g., a laptop computing device, a handheld computing device, a tablet, a netbook, etc.). In various example embodiments, the system 1300 may have more or fewer components and/or different architectures. For example, in some example embodiments, the system 1300 includes one or more cameras, a keyboard, a liquid crystal display (LCD) screen (including a touch screen display), a non-volatile memory port, multiple antennas, a graphics chip, an application specific integrated circuit (ASIC) and speakers.

If the display comprises a touch panel, the display screen may be implemented as a touch screen display to receive an input signal from the user. The touch panel includes one or more touch sensors to sense touches, swipes, and gestures on the touch panel. The touch sensor may sense not only the boundary of the touch or sliding action, but also the duration and pressure associated with the touch or slide operation.

The example embodiment of the present disclosure further provides a non-volatile readable storage medium storing one or more programs or modules, and when the one or more programs or modules are applied to the terminal device, the terminal may execute the instructions to implement the steps of the methods in the example embodiment of the present disclosure.

In an example embodiment, a device is provided, which comprises one or more processors; and one or more machine-readable media having instructions stored thereon, when executed by the one or more processors, that cause the apparatus to perform a method implemented by a data server or a BIOS management server in an example embodiment of the present disclosure.

In an example embodiment, one or more machine-readable media having instructions stored thereon, when executed by one or more processors, cause the apparatus to perform a method implemented by a data server or a BIOS management server in an example embodiment of the present disclosure.

The example embodiment of the present disclosure provides a BIOS flash writing method, a BIOS image file processing method, and a BIOS startup method.

Example 1. A BIOS boot method, including:

obtaining a BIOS image file, wherein the BIOS image file carries a private key signature of the BIOS management server;

verifying that the BIOS image file has validity according to the public key of the BIOS management server;

verifying that the BIOS image file has integrity according to the pre-stored first file parameter; and if both the validity and integrity of the BIOS image file are verified, starting the BIOS.

Example 2 may include the method of example 1 and further comprises:

if either the validity or integrity verification of the BIOS image file fails, the BIOS startup is prohibited.

Example 3 may include the method of example 1, and the verifying that the BIOS image file has integrity according to the pre-stored first file parameter comprises:

generating a corresponding second file parameter according to the BIOS image file;

verifying whether the second file parameter is consistent with the first file parameter; and if they are consistent, determining that the BIOS image file has integrity.

Example 4 may include the method of example 3, the first file parameter carries a private key signature of the data server, and after the generating the corresponding second file parameter according to the BIOS image file, the method further comprises:

signing the second file parameter according to the private key of the data server.

Example 5 may include the method of example 3, and, before the verifying whether the second file parameter is consistent with the first file parameter, the method further comprises:

obtaining the first file parameter from a local storage.

Example 6 may include the method of example 4, the first file parameter is stored in the BIOS management server, and the verifying whether the second file parameter is consistent with the first file parameter comprises:

sending the second file parameter to the BIOS management server;

if the second file parameter fed back by the BIOS management server is consistent with the first file parameter, determining that the BIOS image file has integrity.

Example 7 may include the method of example 6, and before the sending the second file parameter to the BIOS management server, the method further comprises:

signing the second file parameter according to the public key of the BIOS management server.

Example 8 is a BIOS startup method, comprising:

receiving a verification request of the data server for the integrity of the BIOS image file;

verifying the integrity of the BIOS image file according to the first file parameter stored locally; and feeding back the verification result of the integrity verification to the data server.

Example 9 may include the method of example 8, the verification request carries the second file parameter generated by the data server according to the BIOS image file, and the verifying the integrity of the BIOS image file according to the locally stored first file parameter includes:

verifying whether the second file parameter is consistent with the first file parameter; and if they are consistent, determining that the BIOS image file has integrity.

Example 10 may include the method of example 9, and each of the first file parameter and the second file parameter carries a private key signature of the data server.

Example 11 may include the method of example 9, the second file parameter carries a public key signature of a BIOS management server, and, before the verifying whether the second file parameter is consistent with the first file parameter, the method further comprises:

verifying the validity of the second file parameter according to the private key of the BIOS management server.

Example 12 is a data processing method, comprising:

obtaining a BIOS image file, wherein the BIOS image file carries a private key signature of the BIOS management server;

determining that the source of the BIOS image file is valid according to the public key of the BIOS management server; and determining that the BIOS image file is not modified according to the pre-stored first file parameter stored.

The example 13 may include the method of the example 12, and, after the verifying that the BIOS image file is not modified according to the pre-stored first file parameter, the method further comprises starting the BIOS.

Example 14 is a computer device comprising a memory, a processor, and computer programs stored on the memory and executable by the processor, wherein the processor, when executing the computer programs, implements one or more methods of Examples 1-13.

Example 15 is computer readable storage medium having stored thereon computer programs, wherein the computer programs, when executed by a processor, implements one or more methods of Examples 1-13.

The example embodiments are provided for the purposes of illustration and description. Various replacements, and/or alternative and equivalent implementing solutions, calculations are shown to illustrate the implementation of the same purpose in the example embodiments, and do not fall out of the implementation scope of the present disclosure. The present disclosure is intended to cover any adaptations or variations of the example embodiments discussed herein. Therefore, it is apparent that the example embodiments described herein are only limited by the claims and their equivalents.

The present disclosure may further be understood with clauses as follows.

Clause 1. A BIOS boot method comprising: obtaining a BIOS image file, the BIOS image file carrying a private key signature of a BIOS management server; verifying that the BIOS image file has a validity according to a public key of the BIOS management server; verifying that the BIOS image file has an integrity according to a pre-stored first file parameter; and starting a BIOS in response to determining that the validity and the integrity of the BIOS image file are verified.

Clause 2. The method of clause 2, further comprising: prohibiting to start the BIOS in response to determining that either the validity or the integrity of the BIOS image is not verified.

Clause 3. The method of clause 1, wherein the verifying that the BIOS image file has the integrity according to the pre-stored first file parameter includes: generating a corresponding second file parameter according to the BIOS image file; verifying whether the second file parameter is consistent with the first file parameter; and determining that the BIOS image file has the integrity, in response to determining that the second file parameter is consistent with the first file parameter.

Clause 4. The method of clause 3, wherein: the first file parameter carries a private key signature of a data server; and the method further comprises: after the generating the corresponding second file parameter according to the BIOS image file, signing the second file parameter according to a private key of the data server.

Clause 5. The method of clause 3, further comprising: before the verifying whether the second file parameter is consistent with the first file parameter, obtaining the first file parameter from a locally stored memory.

Clause 6. The method of clause 4, wherein: the first file parameter is stored in the BIOS management server; and the verifying whether the second file parameter is consistent with the first file parameter comprises: sending the second file parameter to the BIOS management server; and determining that the BIOS image file has the integrity, in response to receiving confirmation information fed back by the BIOS management server that the second file parameter is consistent with the first file parameter.

Clause 7. The method of clause 6, further comprising: before the sending the second file parameter to the BIOS management server, signing the second file parameter according to a public key of the BIOS management server.

Clause 8. A BIOS boot method, comprising: receiving a verification request of a data server for an integrity of a BIOS image file; verifying the integrity of the BIOS image file according to a locally stored first file parameter; and feeding back a verification result of an integrity verification to the data server.

Clause 9. The method of clause 8, wherein: the verification request carries a second file parameter generated by the data server according to the BIOS image file; and the verifying the integrity of the BIOS image file according to the locally stored first file parameter includes: verifying whether the second file parameter is consistent with the first file parameter; and determining that BIOS image file has the integrity, in response to determining that the second file parameter is consistent with the first file parameter.

Clause 10. The method of clause 9, wherein both the first file parameter and the second file parameter carry a private key signature of the data server.

Clause 11. The method of clause 9, wherein: the second file parameter carries a public key signature of the BIOS management server; and the method further comprises: before the verifying whether the second file parameter is consistent with the first file parameter, verifying a validity of the second file parameter according to a private key of the BIOS management server.

Clause 12. A data processing method comprising: obtaining a BIOS image file, the BIOS image file carrying a private key signature of a BIOS management server; determining that a source of the BIOS image file is valid according to a public key of the BIOS management server; and determining that the BIOS image file is not modified according to a pre-stored first file parameter.

Clause 13. The method of clause 12, further comprising: after determining that the BIOS image file is not modified according to the pre-stored first file parameter, starting a BIOS.

Clause 14. A computing device comprising: computer readable media; one or more processors; and one or more computer programs that are stored on the computer readable media and executable by the one or more processors, wherein: the processor executes the computer program to implement any one or more of the methods in clauses 1-13.

Clause 15. Computer readable media stored thereon one or more computer programs, when executed by one or more processors, cause the one or more processors to perform any one or more of the methods in clauses 1-13.

What is claimed is:

1. A method comprising:
obtaining, by a computing device, a BIOS image file, the BIOS image file carrying a private key signature of a BIOS management server, the BIOS management server including a server that is distinct from the computing device;
verifying that the BIOS image file has a validity according to a public key of the BIOS management server;
verifying that the BIOS image file has an integrity according to a pre-stored first file parameter, the verifying that the BIOS image file has the integrity according to the pre-stored first file parameter including:
generating a corresponding second file parameter according to the BIOS image file;
obtaining the pre-stored first file parameter from a locally stored memory;
verifying that the second file parameter is consistent with the first file parameter; and
determining that the BIOS image file has the integrity; and
starting the BIOS image file after verifying the validity and the integrity of the BIOS image file.

2. The method of claim 1, further comprising:
prohibiting to start the BIOS image file in response to determining that either the validity or the integrity of the BIOS image is not verified.

3. The method of claim 1, wherein:
the first file parameter carries a private key signature of a data server.

4. The method of claim 3, further comprising:
after the generating the corresponding second file parameter according to the BIOS image file,
signing the second file parameter according to a private key of the data server.

5. The method of claim 3, wherein:
the first file parameter is stored in the BIOS management server.

6. The method of claim 1, wherein the verifying that the second file parameter is consistent with the first file parameter includes:
sending the second file parameter to the BIOS management server; and
determining that the BIOS image file has the integrity, in response to receiving confirmation information fed back by the BIOS management server that the second file parameter is consistent with the first file parameter.

7. The method of claim 6, further comprising:
before the sending the second file parameter to the BIOS management server,
signing the second file parameter according to a public key of the BIOS management server.

8. A method comprising:
receiving a verification request of a data server for an integrity of a BIOS image file, the verification request carrying a second file parameter generated by a data server according to the BIOS image file;
verifying the integrity of the BIOS image file according to a locally stored first file parameter, the verifying the integrity of the BIOS image file according to the locally stored first file parameter including:
verifying that the second file parameter is consistent with the first file parameter; and
determining that the BIOS image file has the integrity; and
feeding back a verification result of an integrity verification to the data server.

9. The method of claim 8, wherein:
the second file parameter carries a private key signature of the data server.

10. The method of claim 8, wherein both the first file parameter and the second file parameter carry a private key signature of the data server.

11. The method of claim 8, wherein:
the second file parameter carries a public key signature of the BIOS management server.

12. The method of claim 11, further comprising:
before the verifying that the second file parameter is consistent with the first file parameter, verifying a validity of the second file parameter according to a private key of the BIOS management server.

13. A device comprising:
one or more processors; and
memory storing thereon computer-readable instructions that, when executed by the one or more processors, cause the one or more processors to perform acts comprising:
obtaining a BIOS image file, the BIOS image file carrying a private key signature of a BIOS management server, the BIOS management server including a server that is distinct from the device;
determining that a source of the BIOS image file is valid according to a public key of the BIOS management server; and
determining that the BIOS image file is not modified according to a pre-stored first file parameter, the determining that the BIOS image file is not modified according to the pre-stored first file parameter including:
generating a corresponding second file parameter according to the BIOS image file;
obtaining the pre-stored first file parameter from a locally stored memory;

verifying that the second file parameter is consistent with the first file parameter; and determining that the BIOS image file has the integrity.

14. The device of claim 13, wherein the acts further comprise:

after determining that the BIOS image file is not modified according to the pre-stored first file parameter, starting the BIOS image file.

15. The device of claim 13, wherein:

the first file parameter carries a private key signature of a data server.

16. The device of claim 13, wherein:

the first file parameter is stored in the BIOS management server.

17. The device of claim 13, wherein the acts further comprise:

after the generating the corresponding second file parameter according to the BIOS image file, signing the second file parameter according to a private key of the data serve.

18. The device of claim 13, wherein the verifying that the second file parameter is consistent with the first file parameter includes:

sending the second file parameter to the BIOS management server; and determining that the BIOS image file has the integrity, in response to receiving confirmation information fed back by the BIOS management server that the second file parameter is consistent with the first file parameter.

19. The device of claim 13, wherein the second file parameter carry a private key signature of a data server.

20. The device of claim 13, wherein the second file parameter carries a public key signature of the BIOS management server.

* * * * *